United States Patent [19]

Matthews et al.

[11] Patent Number: 5,489,041

[45] Date of Patent: Feb. 6, 1996

[54] NON-METALLIC OBROUND BLANKING HATCH APPARATUS

[75] Inventors: James F. Matthews, Houston, Tex.; Brett L. Muckelrath; Gail F. Davis, both of Duncan, Okla.

[73] Assignee: Halliburton Company, Duncan, Okla.

[21] Appl. No.: 186,874

[22] Filed: Jan. 24, 1994

Related U.S. Application Data

[63] Continuation-in-part of Ser. No. 49,037, May 26, 1993, which is a continuation-in-part of Ser. No. 932,388, Aug. 19, 1992.

[51] Int. Cl.⁶ .................................................. B65D 88/12
[52] U.S. Cl. ..................... 220/562; 220/327; 220/328; 220/565; 220/661; 49/463
[58] Field of Search .................................. 220/327, 328, 220/562, 565, 601, 661, 3.8; 138/89, 89.2, 90, 92, 96 T; 141/86, 87, 88; 137/234.6; 405/53, 55; 49/463; 52/219, 220.1, 220.8, 171.1

[56] References Cited

U.S. PATENT DOCUMENTS

| | | |
|---|---|---|
| 1,232,788 | 7/1917 | Gibson . |
| 2,004,997 | 6/1935 | McCabe . |
| 2,748,739 | 6/1956 | Monti et al. ................... 220/565 X |
| 2,760,343 | 8/1956 | Reed . |
| 2,843,290 | 7/1958 | Hooper . |
| 2,962,185 | 11/1960 | Starr et al. . |
| 3,058,527 | 10/1962 | Dennis et al. . |
| 3,380,618 | 4/1968 | Phillips . |
| 3,393,824 | 7/1968 | Appleton . |
| 3,470,927 | 10/1969 | Craig . |
| 3,615,036 | 10/1971 | Mross . |
| 4,005,799 | 2/1977 | Mannaerts . |
| 4,195,750 | 4/1980 | Fee . |
| 4,245,754 | 1/1981 | Ellis . |
| 4,252,249 | 2/1981 | Beckhardt et al. . |
| 4,382,521 | 5/1983 | Ostrowsky . |
| 4,384,655 | 5/1983 | Kendall . |
| 4,512,499 | 4/1985 | Uuskallio . |
| 4,576,308 | 3/1986 | Sullivan . |

(List continued on next page.)

FOREIGN PATENT DOCUMENTS

| | | | |
|---|---|---|---|
| 270928 | 5/1927 | United Kingdom | 220/3.8 |
| 8607039 | 12/1986 | WIPO | 220/565 |

OTHER PUBLICATIONS

Exhibits A, B, and C relate to a Clay & Bailey Model 1890 manway hatch.
Exhibit D is a brochure provided by Poly Processing Company entitled Transtore Tanks Series II dated Jun. 1, 1988.
Exhibit E is a photograph of a threaded hatch opening and cover associated with the Poly Processing tank described in Exhibit D.
Exhibit F is a brochure provided by Bonar Plastics entitled *Bonar plastics Poly Payloader®*.
Exhibit G is a photograph of a threaded access opening and cover associated with the Bonar Plastics device described in Exhibit F.

*Primary Examiner*—Allan N. Shoap
*Assistant Examiner*—Stephen Cronin
*Attorney, Agent, or Firm*—Stephen R. Christian

[57] ABSTRACT

Apparatus for holding materials including a container having a container wall, a non-circular container opening extending through the container wall, a non-circular container flange connected to the exterior of the container wall and surrounding the container opening. A non-metallic, non-circular access hatch connectable to the container flange by bolting and having a plurality of apertures extending therethrough is provided. The non-metallic, non-circular access hatch preferably includes a primary opening having a removable cover and a variety of associated components being accommodated by respective apertures such as a recirculation line, a pressure relief valve, a vacuum relief valve, and a fluid level indicator. Preferably the hatch apparatus and the primary opening cover are made of an ultra high molecular weight polyethylene material.

10 Claims, 17 Drawing Sheets

U.S. PATENT DOCUMENTS

| | | | |
|---|---|---|---|
| 4,620,061 | 10/1986 | Appleton | 220/3.8 X |
| 4,625,892 | 12/1986 | Carlin, Jr. . | |
| 4,664,281 | 5/1987 | Falk et al. | 220/3.8 |
| 4,706,841 | 11/1987 | Grajek . | |
| 4,785,963 | 11/1988 | Magley . | |
| 4,884,709 | 12/1989 | McCarthy | 220/565 |
| 5,111,955 | 5/1992 | Baker et al. . | |
| 5,158,204 | 10/1992 | Martrich et al. . | |
| 5,172,584 | 12/1992 | Thomas . | |
| 5,211,304 | 5/1993 | Stolzman . | |
| 5,299,709 | 4/1994 | Beerbower et al. | 220/445 |

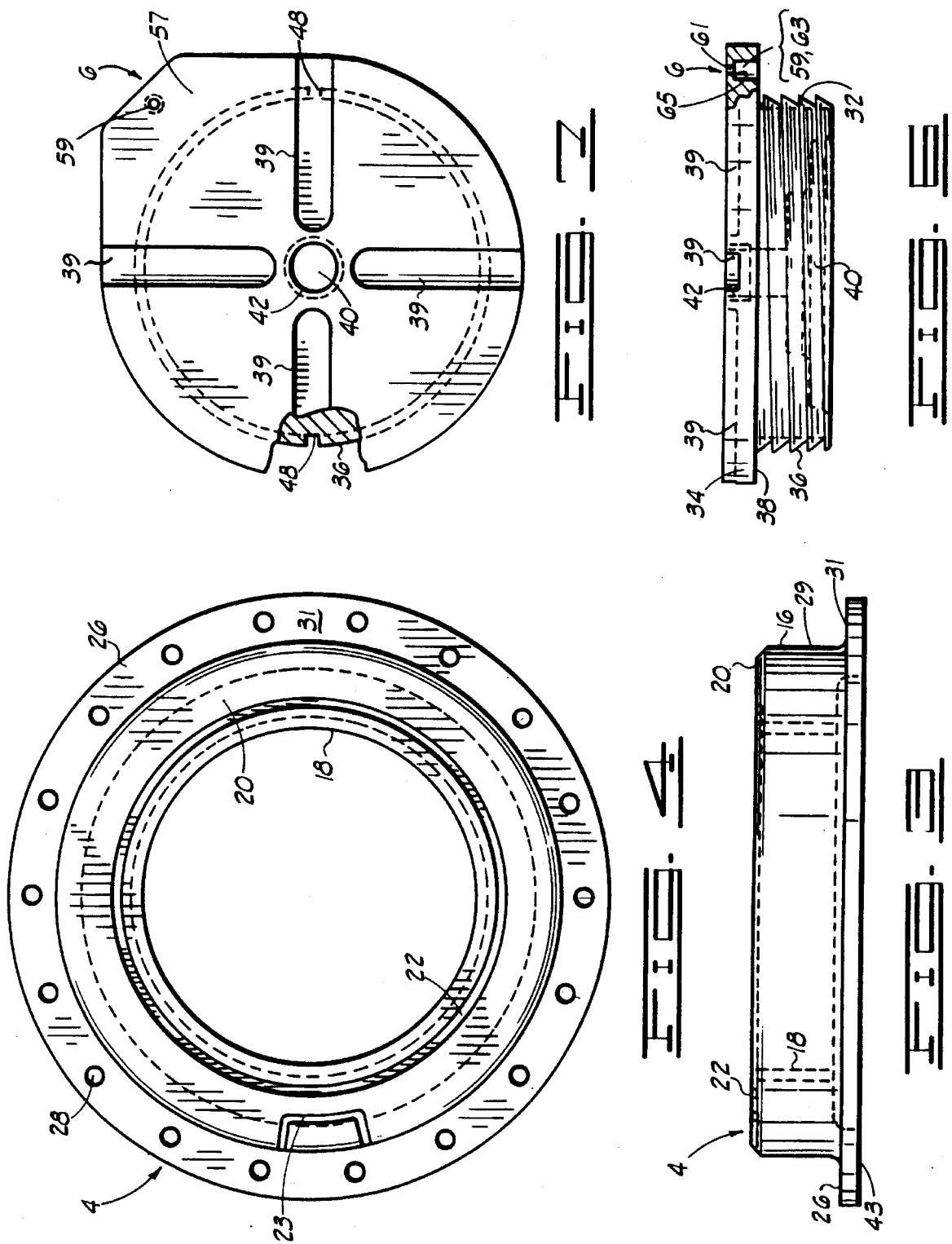

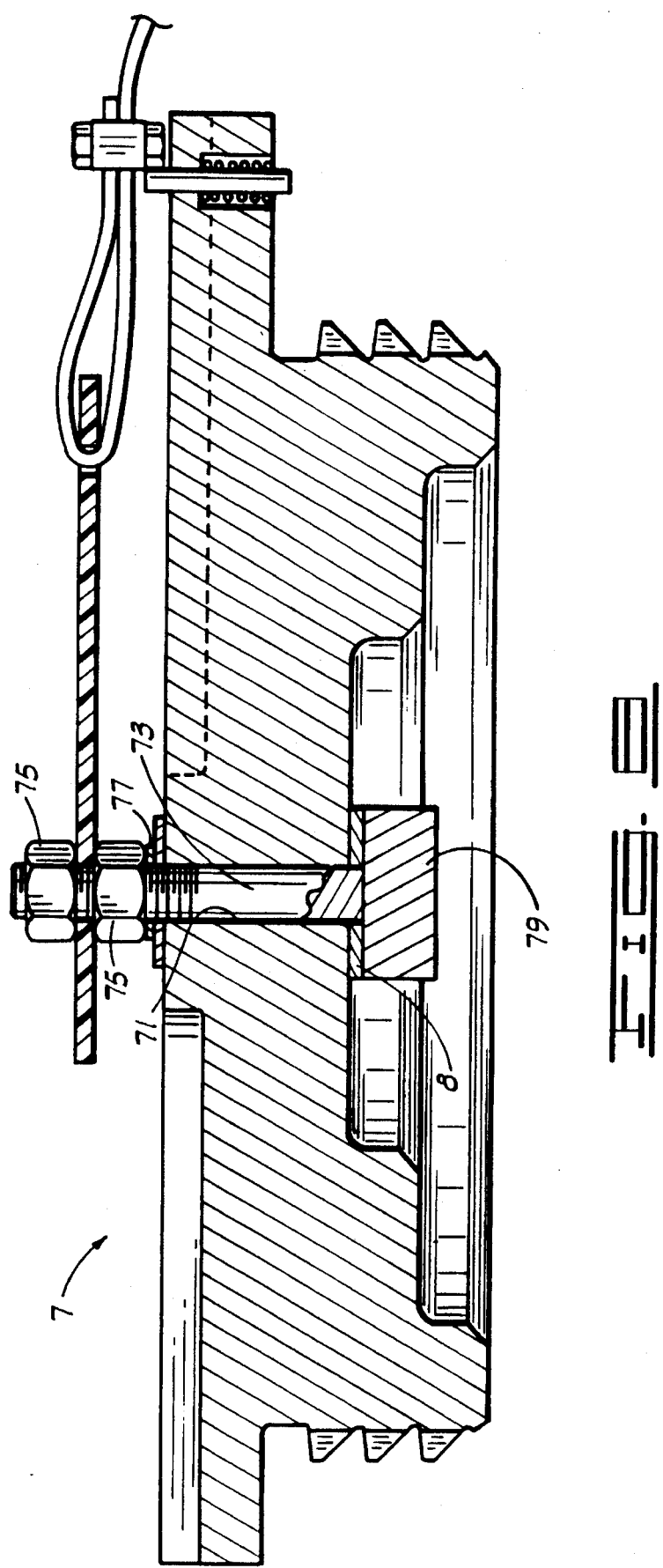

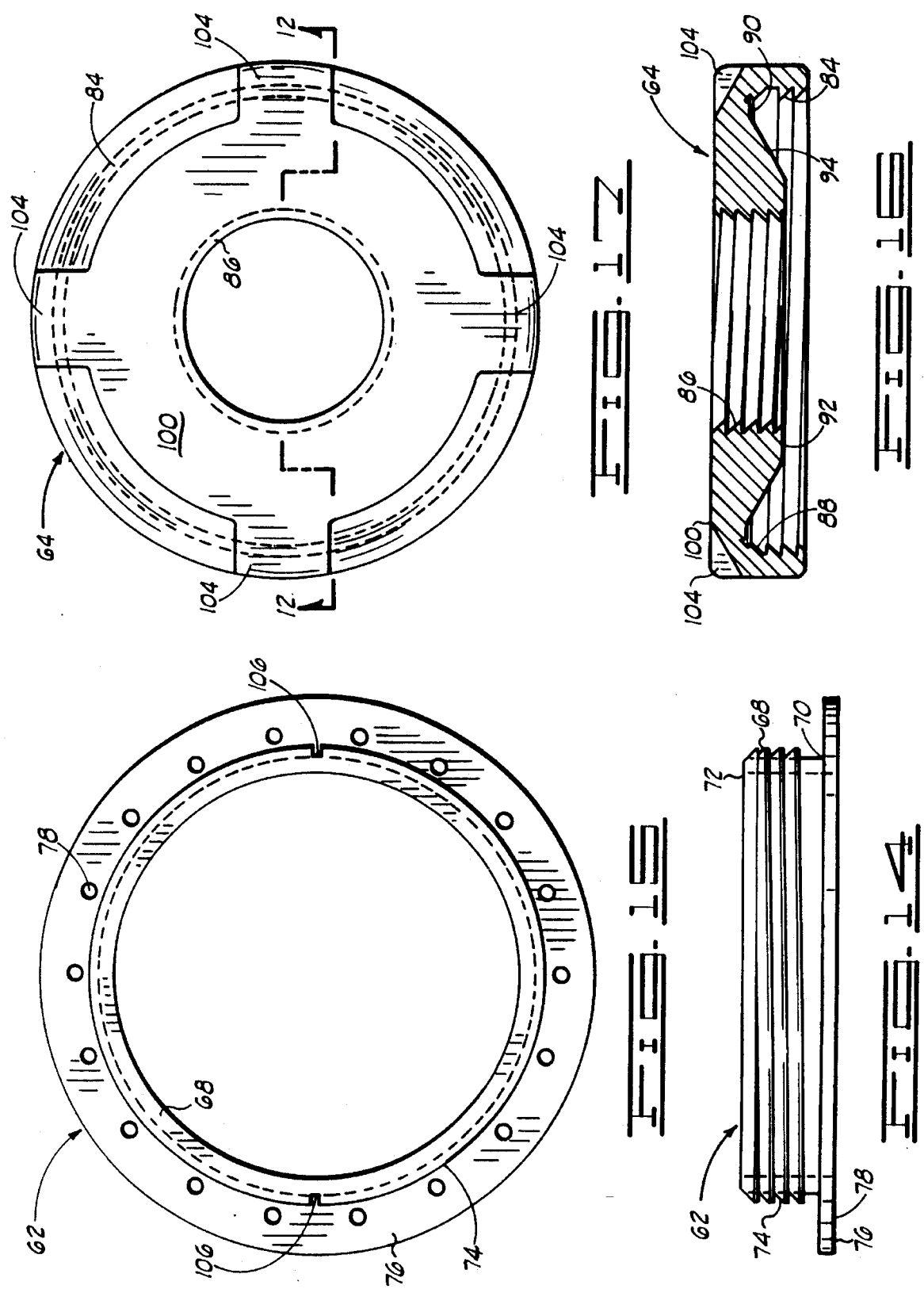

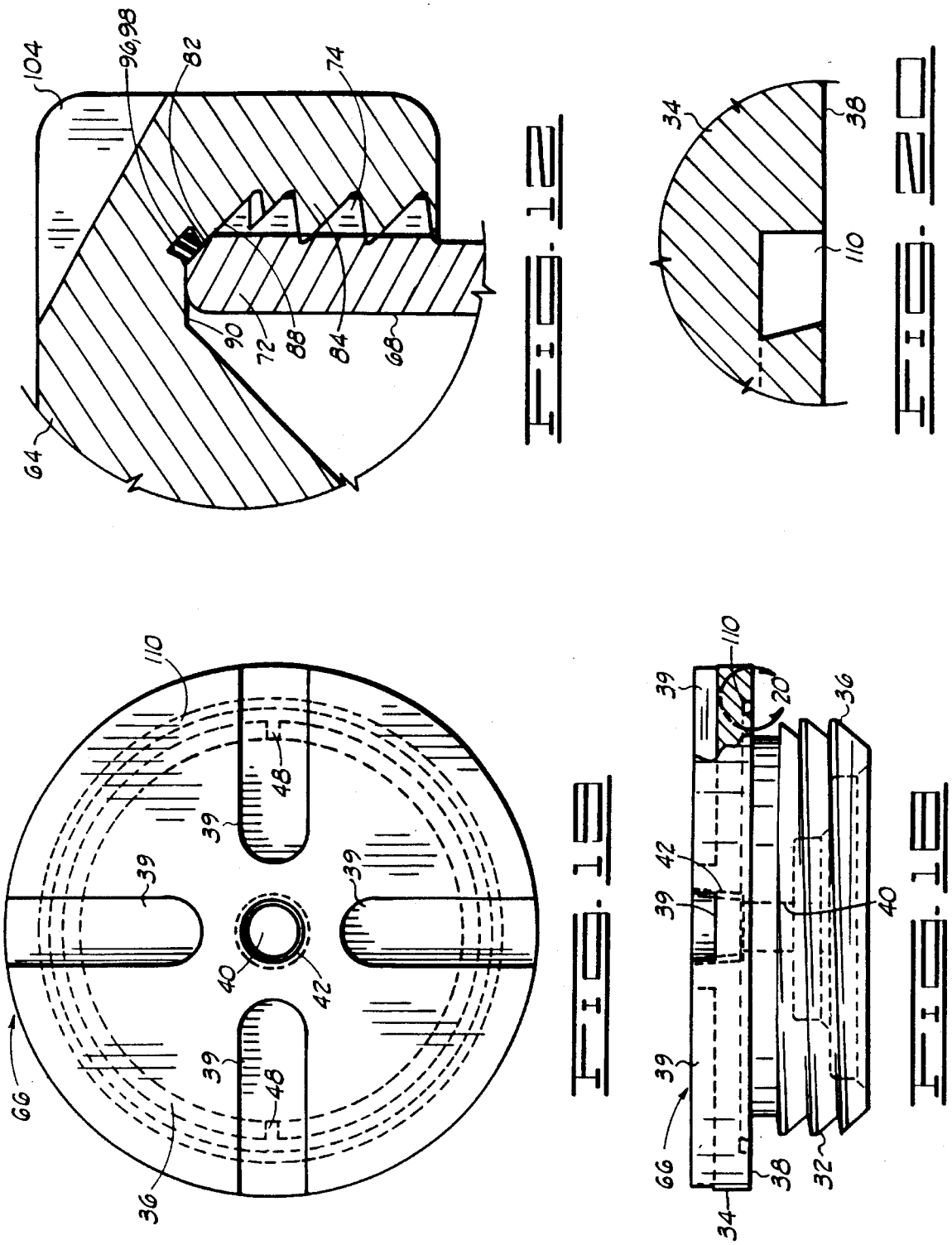

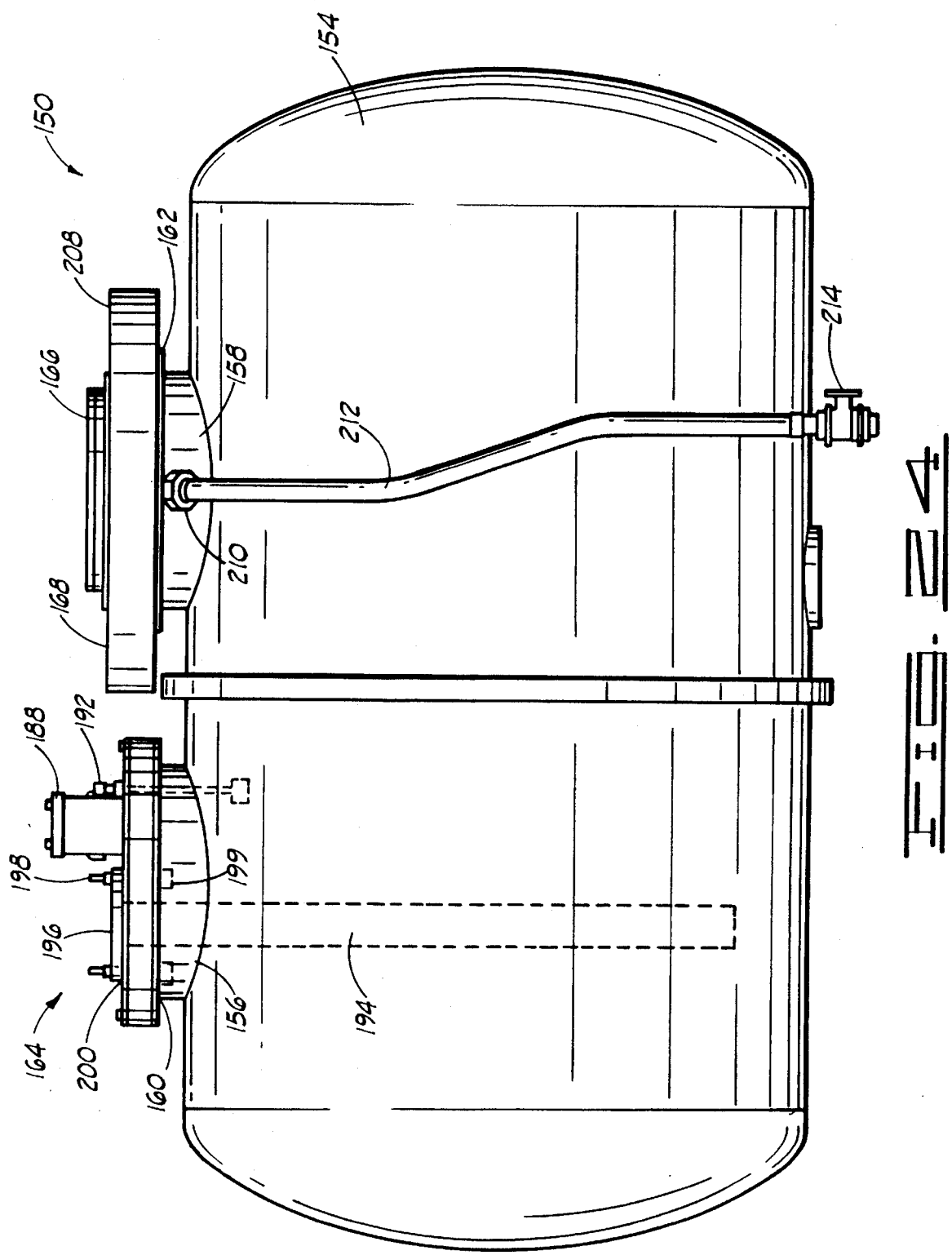

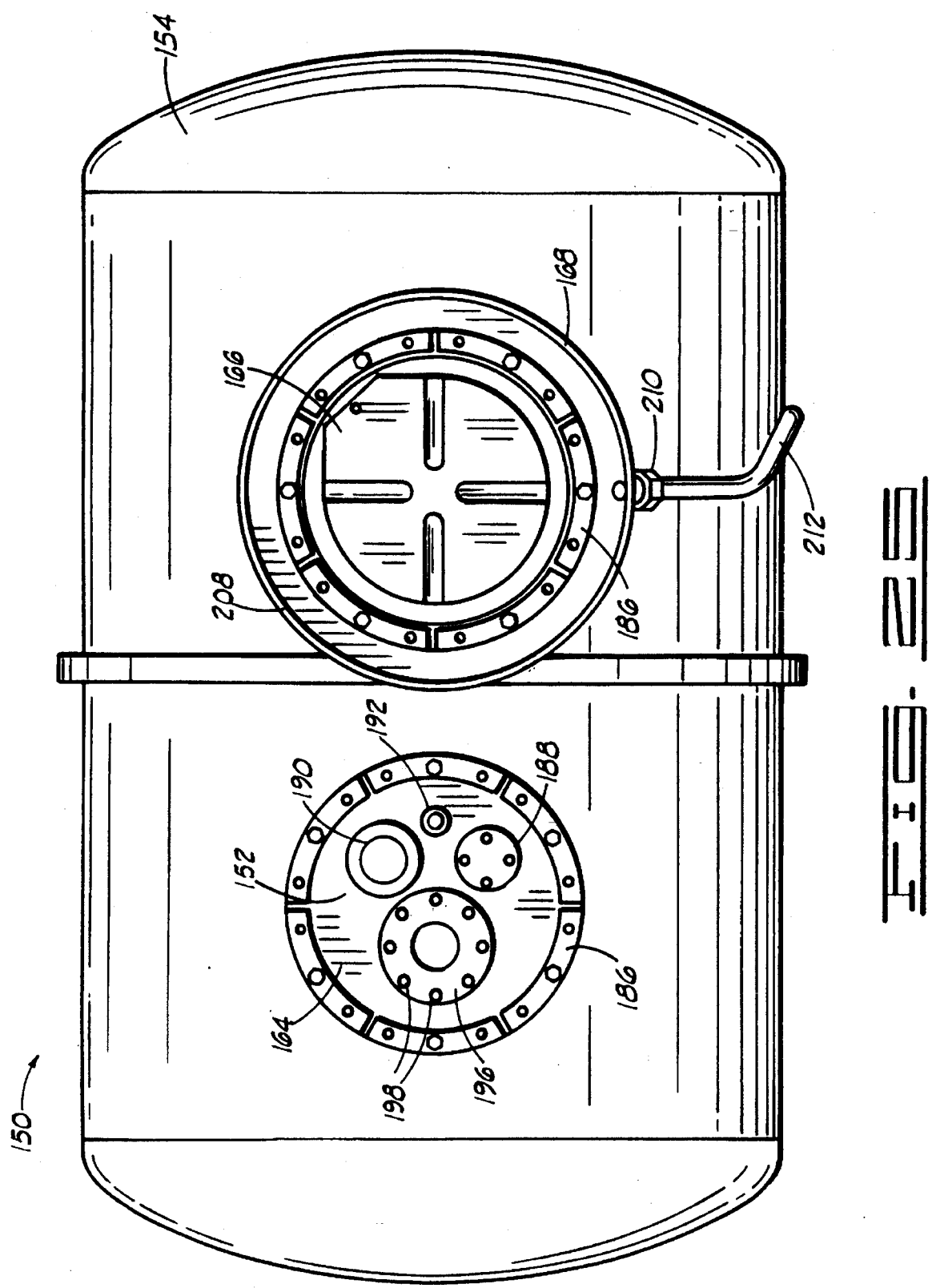

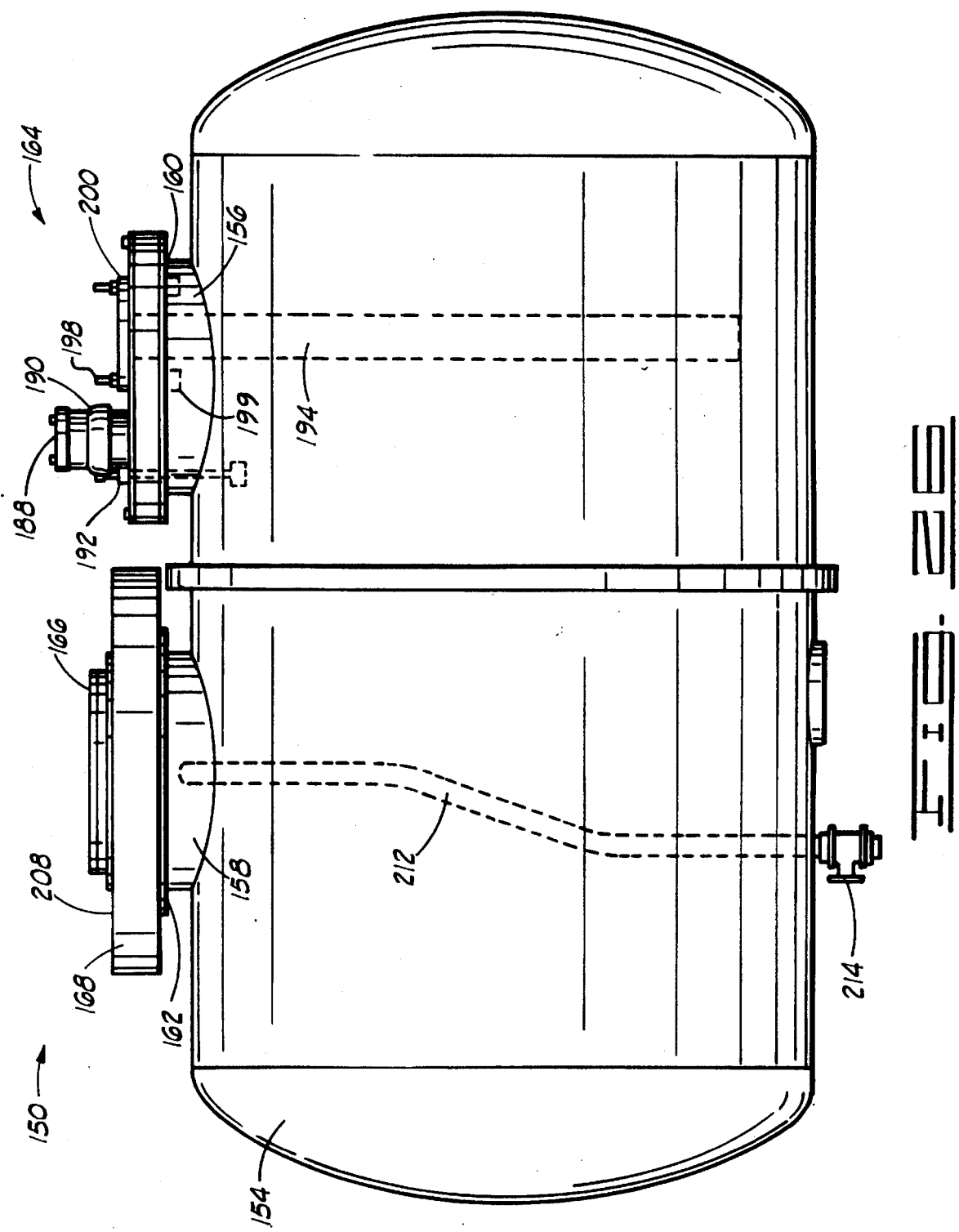

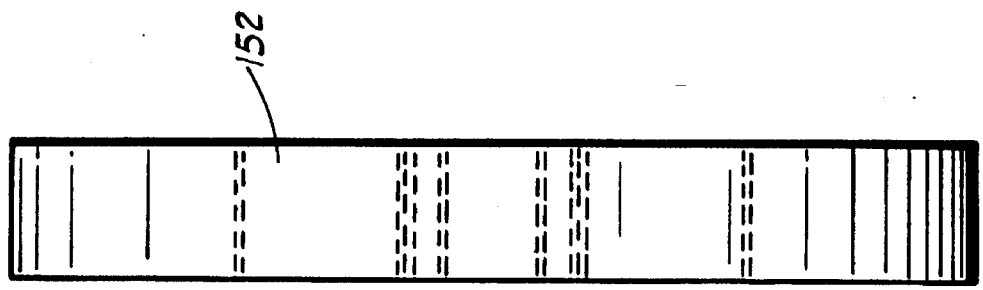
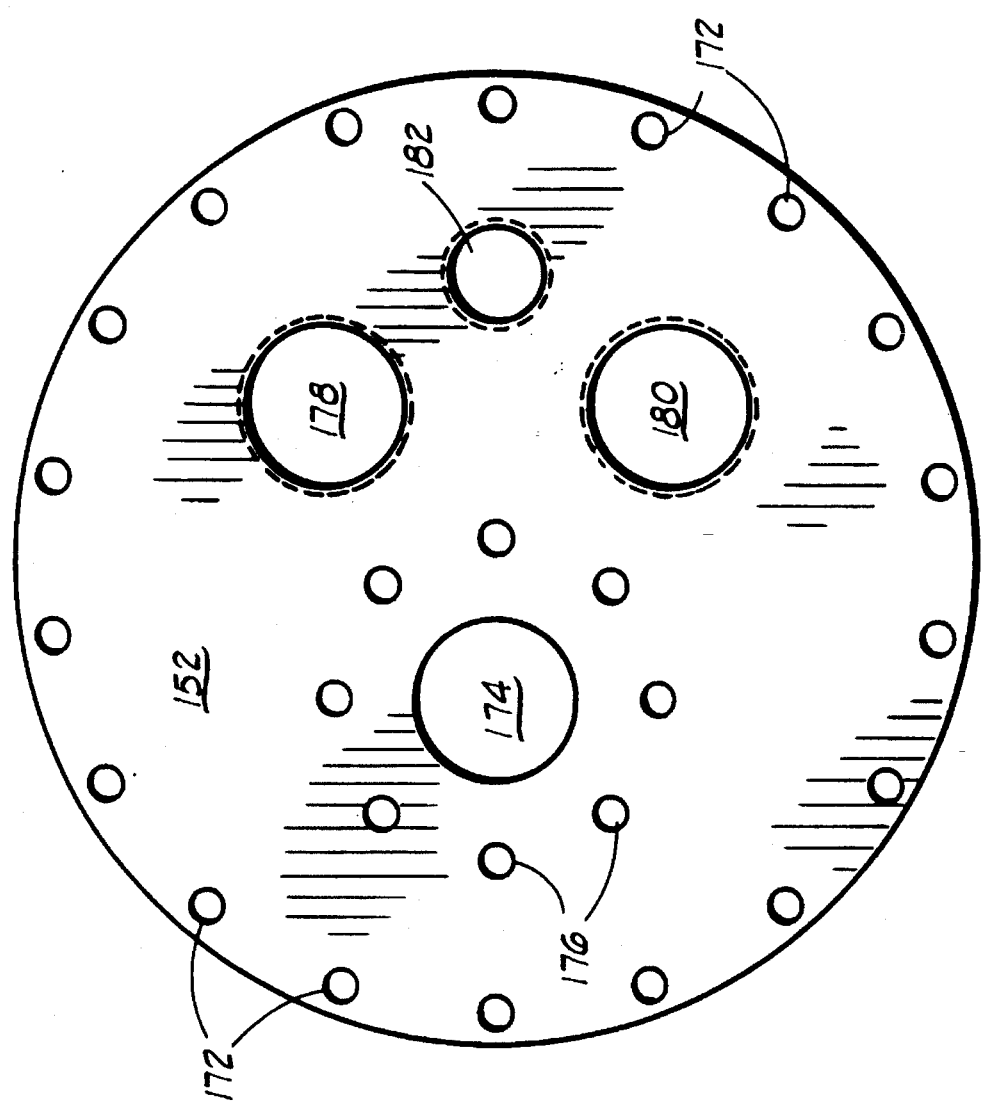

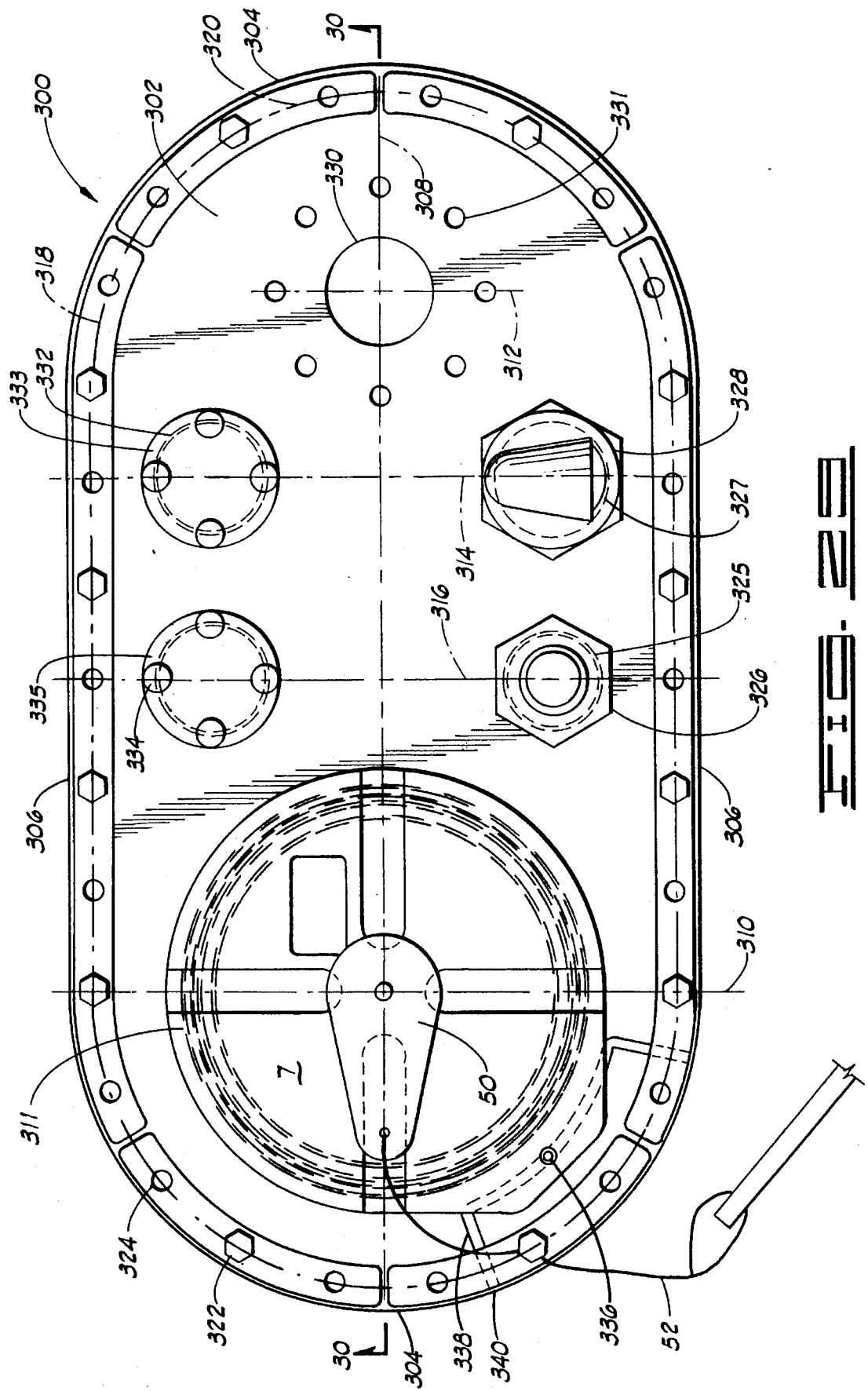

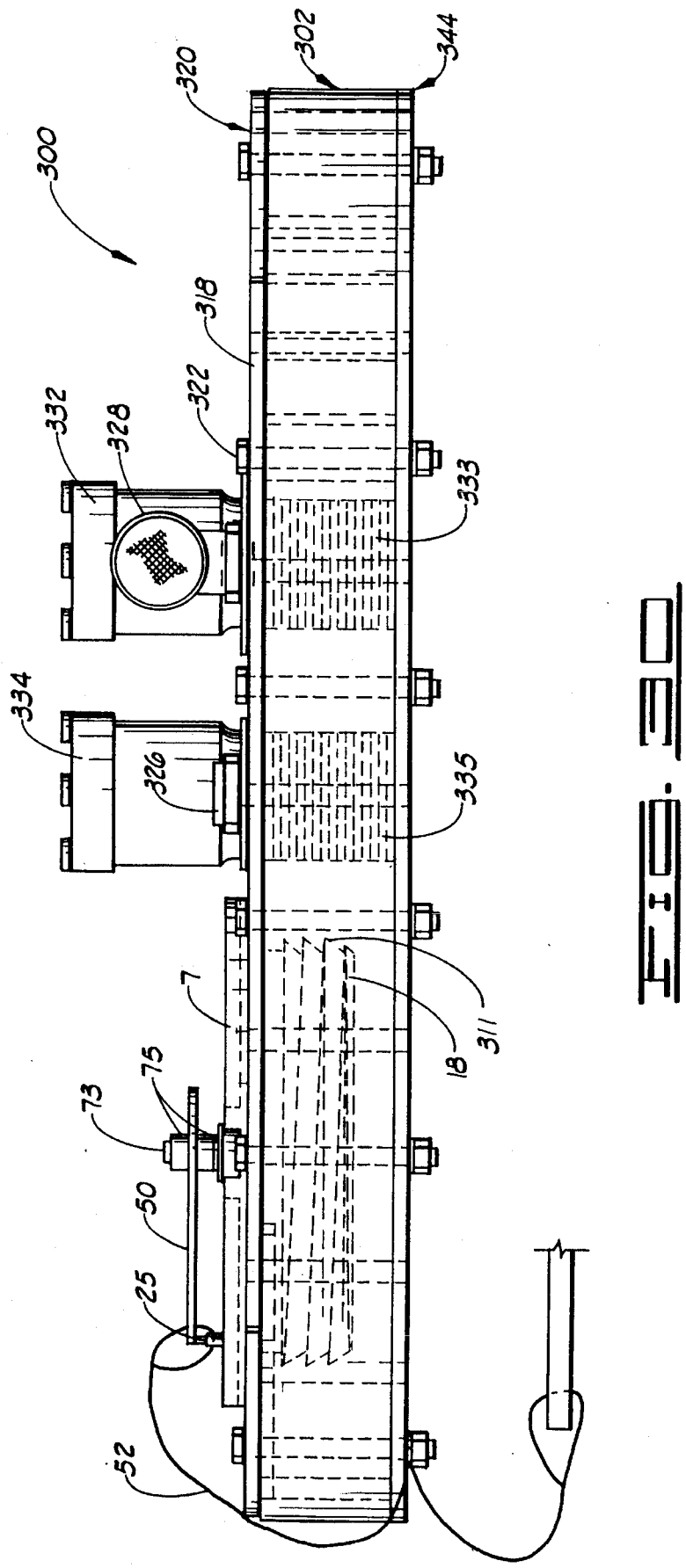

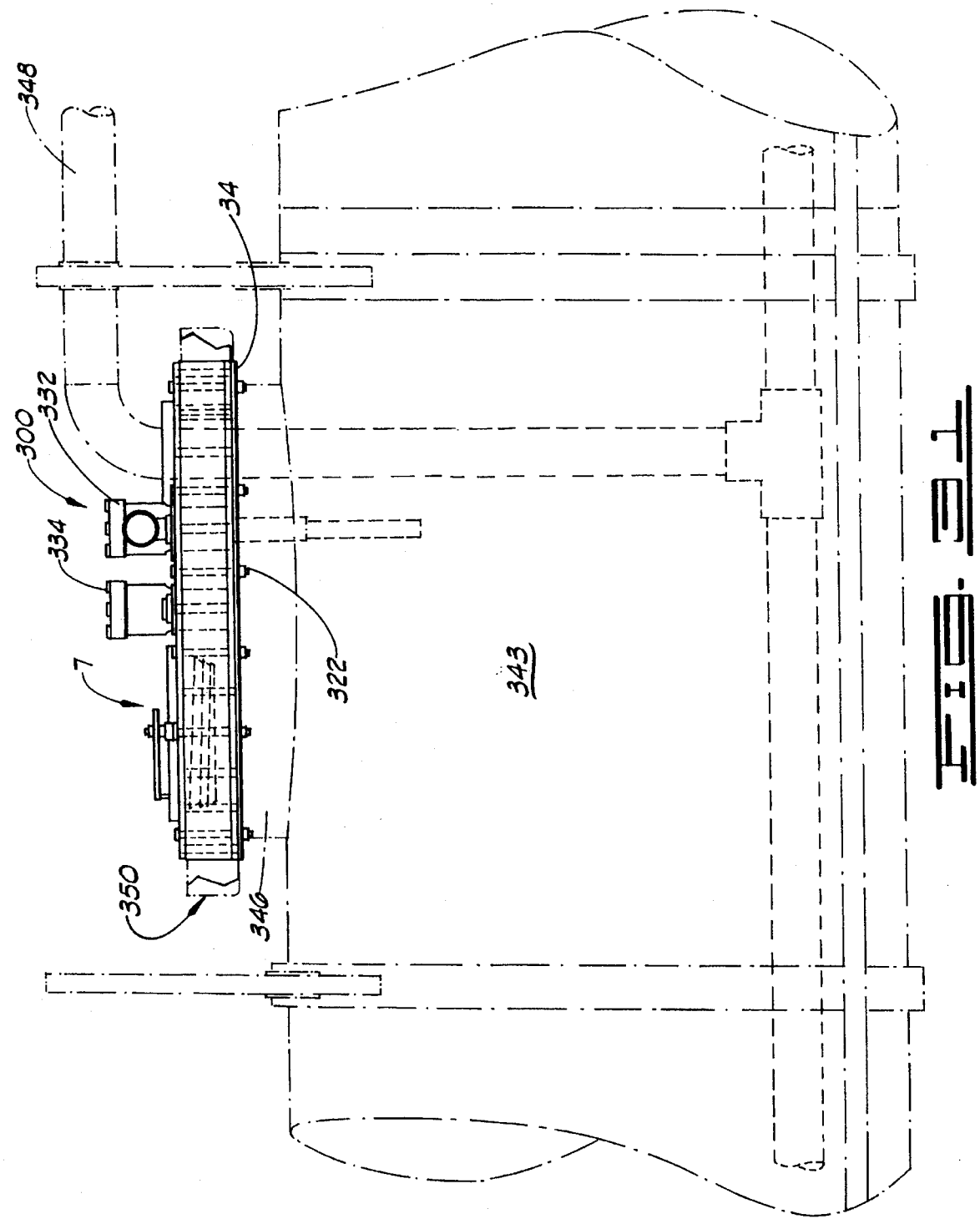

NON-METALLIC OBROUND BLANKING HATCH APPARATUS

This is a Continuation-In-Part of U.S. patent application Ser. No. 08/049,037, filed May 26, 1993, which is a Continuation-In-Part of Ser. No. 07/932,388 filed Aug. 19, 1992.

FIELD OF THE INVENTION

The present invention relates generally to closure devices for containers. More particularly, but not by way of limitation, the present invention relates to non-metallic non-conventionally shaped access hatches suitable for use in corrosive service.

BACKGROUND OF THE INVENTION

A number of oilfield operations utilize corrosive fluids (e.g., acids) which must be transported to the well site in substantial volumes. Due to the hazardous nature of these fluids, great care must be taken when transporting them over the public highways. Numerous regulations are in effect regarding the transport of such materials.

Typically, corrosive fluids used in servicing oil wells are transported in metal tanks carried on trucks or trailers. These tanks typically have access openings, or manways, formed therein which are surrounded by bolted flanges. These manways are typically closed using metal manway, or access, covers such as the Model 1890 access cover sold by Clay & Bailey. The Clay & Bailey Model 1890 access cover meets the requirements of Department of Transportation (DOT) specification 412 at a test pressure of 36 psi.

The Clay & Bailey Model 1890 access cover includes a base portion having a flange adapted to be bolted to the flange surrounding the manway of a fluid tank. An access cover is connected to the base portion of the Clay & Bailey apparatus by a hinge. A plurality of cam locking arms fold over the metal cover when it is in a closed position, thus locking the metal cover in place. The inner surface of the Clay & Bailey cover may be lined in order to protect the cover from corrosion. However, this corrosion-resistant liner is susceptible to being torn away from the cover or otherwise damaged. Moreover, the Model 1890 cover includes numerous intricately shaped exterior metal components, such as cams, latches, pins and the like, which are susceptible to corrosion.

Non-metallic containers, such as those sold by Poly Processing Company of Monroe, Louisiana under the designation TRANSTORE TANKS SERIES II, have also been used for storing and transporting corrosive fluids. The tanks sold by Poly Processing Company are manufactured from high density polyethylene and have integrally molded access openings which include female threads for threadingly receiving male threaded cover plugs. These male threaded cover plugs have hammer lugs formed therein.

Non-metallic tanks for storing and transporting corrosive fluids have also been sold by Bonar Plastics under the designation POLY PAYLOADER®. Each of these containers has an integrally molded neck opening with external male threads defined thereon. A molded non-metallic cap screws onto the threaded neck to close the neck opening.

Neither the TRANSTORE TANKS SERIES II tanks nor the POLY PAYLOADER® tanks just described meet the requirements of DOT specification 412 at a test pressure of 36 psi. Rather, these tanks meet only the requirements of DOT specification 57 at a test pressure of 15 psi.

Providing a metallic tank with non-metallic, i.e., polymer, liners are known within the art. However, polymer lined tanks can be prone to developing cracks within the liner to hatch-flange interface, thereby exposing the metallic wall of the tank to the corrosive liquid contained within the liner. Furthermore, this cracking problem is aggravated when multiple openings, each having a respective flange for receiving a hatch or a preselected component, are provided within a single tank. Thus, it would be beneficial to the art to be able to reduce the likelihood of such stress-induced cracking from occurring, especially in the case where multiple openings in a single tank are required.

U.S. Pat. No. 5,111,955 discloses a non-metallic hatch designed for use on an acid tank. The non-metallic hatch of U.S. Pat. No. 5,111,955 meets the requirements of DOT 412 at a test pressure of 36 psi. The non-metallic hatch includes a base and a lid. The base includes a base flange which is complementary to, and is constructed to be bolted to, an acid tank manway flange. The base also has an opening defined therethrough and includes a male threaded portion which surrounds the opening. The hatch lid has a female threaded portion thereon which is complementary to the male threaded portion of the base so that the lid can be threadedly engaged with the base in order to close the acid tank manway.

SUMMARY OF THE INVENTION

The present invention as claimed herein provides an improved hatch apparatus which is exceptionally well-suited for use on containers used for storing and/or transporting corrosive materials. The inventive hatch apparatus is made of a corrosion resistant plastic material (e.g., ultra-high molecular weight polyethylene) and does not utilize hinges, latches, cams, or linings. The inventive hatch apparatus is of a non-conventional geometry, yet is able to meet the requirements of DOT specification 412 at a test pressure of 36 psig or higher. Further, the present inventive hatch apparatus will function suitably even when bolted to a distorted container flange having an otherwise non-conventional geometry. Furthermore, the present hatch apparatus disposes of the need to have several openings, and associated stress prone flanges thereof, in a single tank.

The present invention further provides a non-conventionally, or irregularly, shaped hatch apparatus for a container, said container having a container opening defined therein with a likewise non-conventional, or irregularly, shaped container flange surrounding the container opening. The inventive hatch apparatus comprises a like-wise non-conventional, or irregularly, shaped non-metallic base being adapted to accommodate a non-metallic lid for sealing a small, convenient, primary opening which can be used for gauging, adding chemicals, viewing circulation, and for generally any other routine, day-to-day tank operation. This primary opening, which allows operators and inspectors limited, but acceptable, access into the tank, is sealed using a small lid member which is lightweight and easy to operate. By using the small primary opening of the inventive hatch apparatus for routine, day-to-day operations, a substantial safety improvement is also realized since tank operators cannot accidentally fall through the small primary opening.

The non-metallic access hatch base, having a preselected thickness, includes a primary passageway extending therethrough, a threaded cylindrical bore defining at least a portion of the passageway and having a nominal inside diameter $D_1$. The container flange is sealingly connected to the access hatch base and the container flange preferably has a major diameter D3 and a minor diameter $D_4$. The non-metallic lid includes a male threaded portion which is threadedly receivable in the threaded cylindrical bore of the base. The non-conventionally shaped access hatch base is complementary to the container flange such that the base can be sealingly bolted to the container flange, and preferably has a major diameter and a minor diameter.

The present invention preferably further provides an unconventionally shaped hatch apparatus having an obround non-metallic base, a removable non-metallic lid, at least one over-pressure relief means, at least one vacuum relief means, at least one recirculation means, and at least one level indicator means. The obround non-metallic base is fluidly connectable to a container having an obround container flange by bolting. The base has a primary passageway extending therethrough such that, when the base is connected to the container flange, the base passageway is placed in communication with the container opening. The base also includes a female threaded portion inside the base passageway. The non-metallic lid includes a male threaded portion which is threadedly receivable in the female threaded portion of the base. The lid also has a lid passageway extending therethrough. The male threaded portion of the lid surrounds at least a portion of the lid passageway such that, when the male threaded portion of the lid is received in the female threaded portion of the base, the lid passageway is placed in communication with the base passageway. The at least one pressure relief means is associatable with a respective passageway and is operable for relieving an over pressure differential between the interior and the exterior of the container. The at least one vacuum relief means is associatable with a respective passageway and is operable for relieving a vacuum between the interior and the exterior of the container. The at least one level indicator means is associatable with a respective passageway and is operable for indicating the level of a fluid contained within the interior of the container. The at least one recirculation means is associatable with a respective passageway and is operable for returning fluid or replenishing fluid within the container.

Numerous other objects, features, and advantages of the present invention will be readily apparent to those skilled in the art upon reference to the accompanying drawings and upon reading the following description of the preferred embodiments.

DESCRIPTION OF THE DRAWINGS

FIG. 3 is a side view of base 4 of hatch apparatus 2.

FIG. 4 is a top view of base 4.

FIG. 6 is a side view of lid 6 of hatch apparatus 2.

FIG. 7 is a partially cutaway top view of lid 6 of hatch apparatus 2.

FIG. 8 is a cutaway side view of an alternate lid 7 for hatch apparatus 2.

FIG. 12 is an enlarged view of section 12 identified in FIG. 11.

FIG. 14 is a side view of base 62 of hatch apparatus 60.

FIG. 15 is a top view of base 62.

FIG. 16 is a cutaway side view of first lid member 64 of hatch apparatus 60.

FIG. 17 is a top view of first lid member 64.

FIG. 18 is a partially cutaway side view of second lid member 66 of hatch apparatus 60.

FIG. 19 is a top view of second lid member 66.

FIG. 20 is an enlarged view of groove 110 of second lid member 66.

FIG. 24 provides a first elevational side view of an inventive material storage and/or transportation apparatus 150.

FIG. 25 provides a top view of inventive apparatus 150.

FIG. 26 provides a second elevational side view of inventive apparatus 150.

FIG. 27 provides a top view of an inventive blanking hatch used in inventive apparatus 150.

FIG. 28 provides a side view of inventive blanking hatch 152.

FIG. 29 provides a top view of a non-conventionally shaped non-metallic access hatch 300 disclosed herein.

FIG. 30 provides a cross-sectional frontal edge view of access hatch 300 shown in FIG. 29.

FIG. 31 provides a side view, partially broken away, of a material storage and/or transportation container as disclosed herein making use of access hatch 300 disclosed herein.

DESCRIPTION OF THE PREFERRED EMBODIMENTS

Inventive Manway Hatch Apparatus

Figure 1:
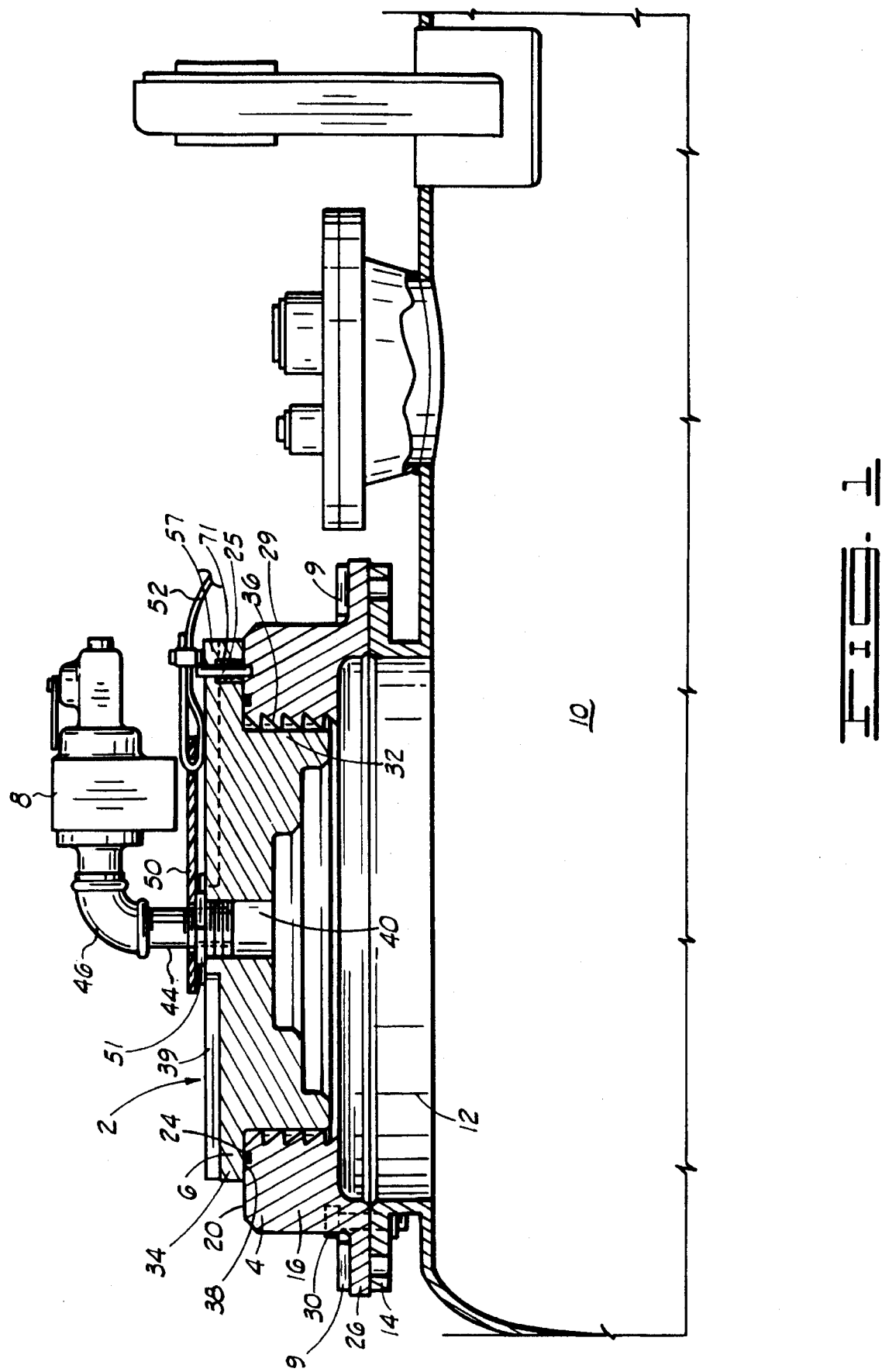
FIG. 1 is a cutaway side view of an inventive hatch apparatus 2.

A first embodiment 2 of the manway hatch is depicted in FIGS. 1–10. Hatch apparatus 2 comprises a base 4 and a lid 6 or 7 which is threadedly connectable to base 4. Hatch apparatus 2 can also include a pressure relief valve 8. As indicated in FIG. 1, hatch apparatus 2 is well-suited for use as a manway hatch on a container 10 having a container flange 14 surrounding a container opening 12. Base 4, lid 6, and alternative lid 7 of hatch apparatus 2 are preferably each composed of a non-metallic corrosion-resistant material. Most preferably, base 4 and lids 6 and 7 are composed of ultra-high molecular weight polyethylene.

Base 4 of hatch apparatus 2 includes a cylindrical collar 16 having a cylindrical threaded bore 18 extending therethrough. Collar 16 has a radial upper surface 20 with a circular groove 22 formed therein for receiving an O-ring 24. Radial upper surface 20 also has a groove 23 formed therein for receiving the end of a locking pin 25 from lid 6. When locking pin 25 is received in groove 23, lid 6 is prevented from being threadedly disconnected from base 4. Base 4 further includes a base flange 26 having bolting holes 28 formed therein. Base flange 26 is complementary to container flange 14 such that base flange 26 can be bolted to container flange 14 using bolts 30 and backing brackets 9.

Base 4 is advantageously constructed such that base flange 26 can be sealingly bolted to a distorted (i.e., uneven) container flange 14 without causing cylindrical threaded bore 18 of collar 16 to be pulled out-of-round. Consequently, when base flange 26 is bolted to a distorted container flange 14, the female threads of collar 16 remain substantially even such that lid 6 can be threadedly connected to and disconnected from base 4.

Figure 5:
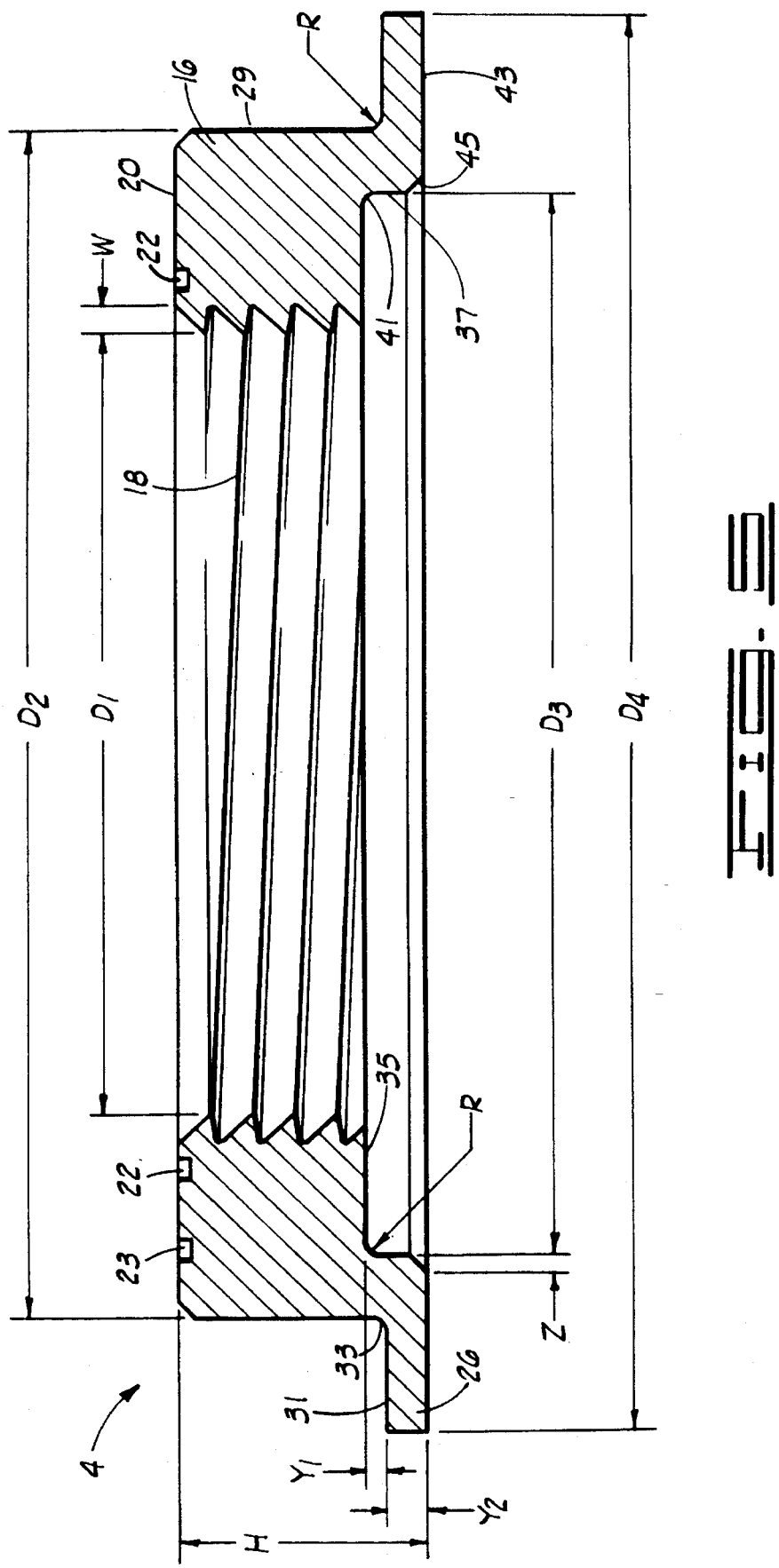
FIG. 5 is a cutaway side view of base 4.

In order to allow base flange 26 to be sealingly bolted to a distorted container flange without causing cylindrical threaded bore 18 of base collar 16 to be pulled out-of-round, base 4 is constructed such that (a) the radial thickness of collar 16 is substantially greater than the radial thickness of the connection between collar 16 and flange 26 and (b) the inside diameter of collar 16 is substantially less than the inside diameter of base flange 26. Specifically, as shown in FIG. 5, base 4 preferably comprises: an exterior cylindrical surface 29; a radial upper flange surface 31; a curved surface 33 extending between the lower end of exterior cylindrical surface 29 and the inner edge of radial upper flange surface 31; a radial inner surface 35 extending outwardly from the lower end of cylindrical threaded bore 18; a lower cylindrical bore 37; a curved surface 41 extending between the outer edge of radial inner surface 35 and the upper end of cylindrical bore 37; a radial lower flange surface 43; and a chamfered surface 45 extending downwardly and outwardly from the lower end of cylindrical bore 37 to the inner edge of radial lower flange surface 43. As also shown in FIG. 5: the inside diameter $D_1$ of threaded bore 18 of collar 16 is substantially less than the outside diameter $D_2$ of exterior cylindrical surface 29. Additionally, the inside diameter $D_3$ of lower cylindrical bore 37 is less than $D_2$ but is substantially greater than $D_1$. Further, a gap $Y_1$ preferably exists between radial upper flange surface 31 and radial inner surface 35.

In a preferred embodiment of hatch apparatus 2, $D_1$ is not more than about 75% of $D_2$, $D_1$ is not more than about 85% of $D_3$, $Y_1$ is in the range of from 0 to about 1.0 inches, and flange 26 has a thickness ($Y_2$) of not greater than about 1.5 inches. Most preferably, $D_1$ is in the range of from about 60% to about 70% of $D_2$, $D_1$ is in the range of from about 68% to about 78% of $D_3$, and $Y_2$ is not greater than about 1.0 inches. Further, $Y_1$ is most preferably in the range of from about 0.1 to about 0.75 inches.

In a particularly preferred embodiment of hatch apparatus 2 wherein hatch apparatus 2 is sized to be bolted to a standard 18 inch manway flange, $D_1$=about 12.4 inches, $D_2$=about 19.0 inches, $D_3$=about 17.0 inches, $Y_1$=about 0.37 inches, and $Y_2$=about 0.63 inches. Additionally, in this particularly preferred embodiment, the female threads of base 4 have a thread width (W) of about 0.442 inches, curved surfaces 33 and 41 each have a radius of curvature (R) of about 0.25 inches, chamfered surface 45 is chamfered at an angle of about 45°, chamfered surface 45 has a dimension (Z) of about 0.25 inches, base 4 has an overall height (H) of about 4.0 inches, and the outside diameter ($D_4$) of base flange 26 is about 22.75 inches.

Figure 2:
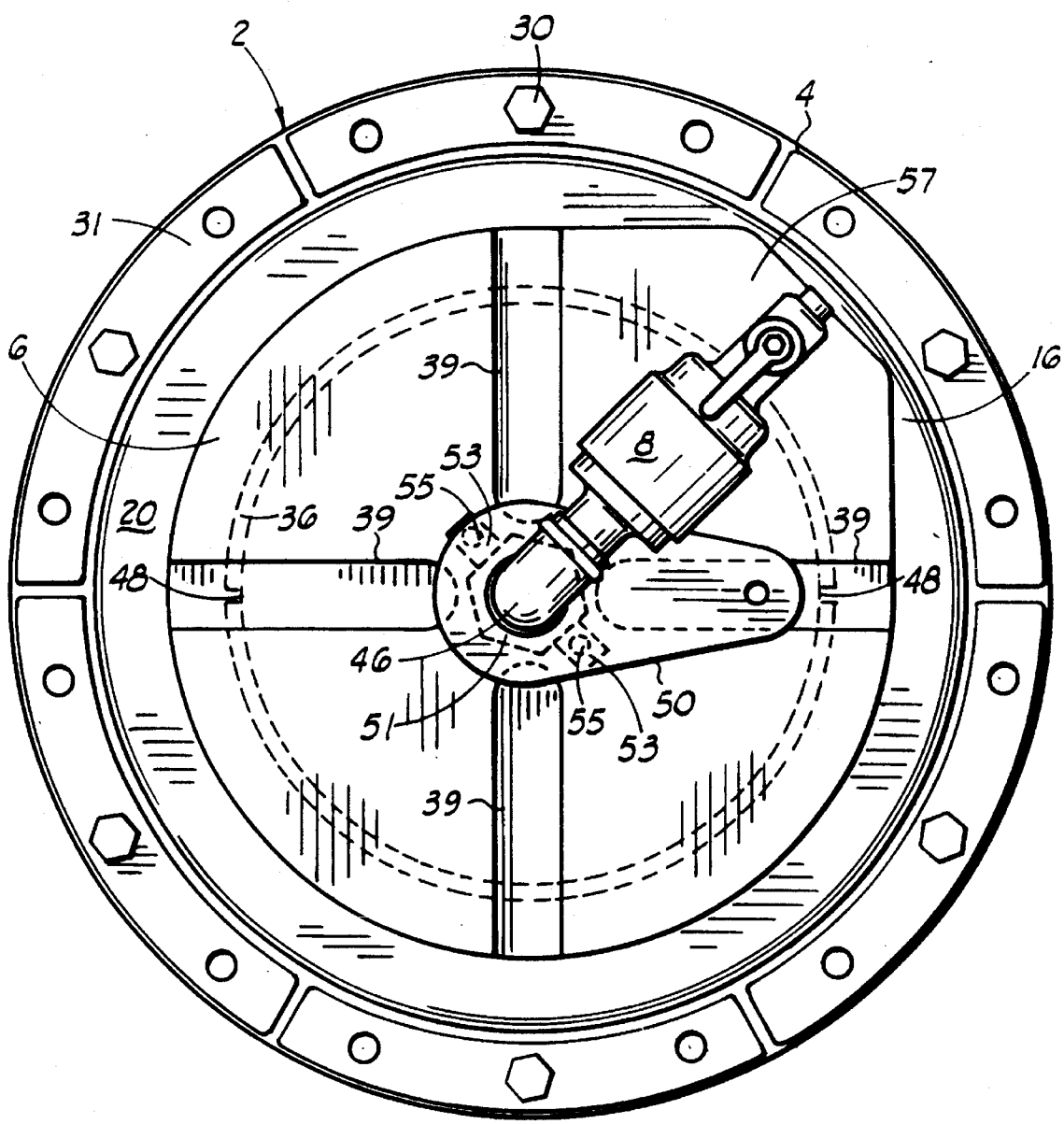
FIG. 2 is a top view of hatch apparatus 2.

Lid 6 comprises a lower cylindrical portion 32 and an upper portion 34 adjacent lower cylindrical portion 32. Lower cylindrical portion 32 includes a male threaded portion 36 which is threadedly receivable in threaded bore 18 of base 4 for connecting lid 6 to base 4. Upper portion 34 includes a lower radial surface 38 which extends outwardly from the axial upper end of lower cylindrical portion 32. When male threaded portion 36 of lid 6 is threadedly received in bore 18 of base 4, lower radial surface 38 abuts radial upper surface 20 of base 4 such that O-ring 24 seals the threaded connection between lid 6 and base 4. Preferably, at least one tool groove 39 is formed on upper cylindrical portion 34 of lid 6 to facilitate the threaded attachment of lid 6 to, and the removal of lid 6 from, base 4. A relief bore 40 preferably extends through lid 6 of hatch apparatus 2. Relief bore 40 preferably includes a female threaded portion 42. As shown in FIGS. 1 and 2, a bushing 51 having exterior and interior threads is preferably screwed into female threaded portion 42 of relief bore 40. The threaded connection between bushing 51 and threaded portion 42 is preferably sealed using a chemical sealant. Bushing 51 also includes ears 53 having holes extending therethrough for locking bushing 51 in place in lid 6 using screws 55.

A pressure relief valve 8 can be associated with relief bore 40 of lid 6 for relieving a pressure differential between the interior and the exterior of container 10. In hatch apparatus 2 depicted in FIGS. 1 and 2, relief valve 8 is associated with lid 6 using a conduit means comprising a male threaded union 44 and a female threaded elbow 46. Union 44 and elbow 46 are threadedly connected between bushing 51 and relief valve 8.

Examples of pressure relief valves suitable for use in conjunction with the inventive apparatus include the Kunkle Model 912 BFE06-NC one inch brass relief valve and the Kunkle Model 226P- E00-K one inch stainless steel relief valve.

Upper portion 34 of lid 6 also preferably includes an outward extension 57 having an aperture 59 extending therethrough. Aperture 59 preferably includes: an upper cylindrical bore 61 extending into portion 34 from the upper side of portion 34; a lower cylindrical bore 63 extending from the lower end of bore 61 to lower radial surface 38 of lid portion 34, the cross-sectional diameter of cylindrical bore 63 being larger than the cross-sectional diameter of bore 61; and a radial surface 65 defined by the transition from the lower end of bore 61 to the upper end of bore 63. As depicted in FIG. 1, locking pin 25 extends longitudinally through aperture 59. Additionally, a spring 71 is preferably connected to pin 25 and positioned in lower bore 63 of aperture 59. Spring 71 abuts radial surface 65 of aperture 59 and urges locking pin 25 downward. Consequently, when lid 6 is threadedly connected to base 4, spring 71 urges pin 25 into groove 23 formed in radial upper surface 20 of base 4. Further, spring 71 holds pin 25 in groove 23 such that lid 6 will not become threadedly disconnected from base 4 due to vibration or other forces acting on container 10 while container 10 is being transported.

Hatch apparatus 2 also preferably includes a safety vent means for relieving pressure buildup in container 10 as lid 6 is disconnected from base 4. The safety vent means most preferably comprises at least one vent groove formed across the male threaded portion 36 of lid 6. The safety vent means preferably comprises two vent grooves 48 formed across male threaded portion 36 of lid 6.

As further indicated in FIG. 1, lid 6 of inventive hatch apparatus 2 is preferably tethered to container flange 14 or to some other structure on tank 10 using a non-metallic tether bracket 50 and a tether cord 52. Tying lid 6 to tank 10 in this manner prevents lid 6 from being dropped and/or lost when lid 6 is disconnected from base 4.

Figure 9:
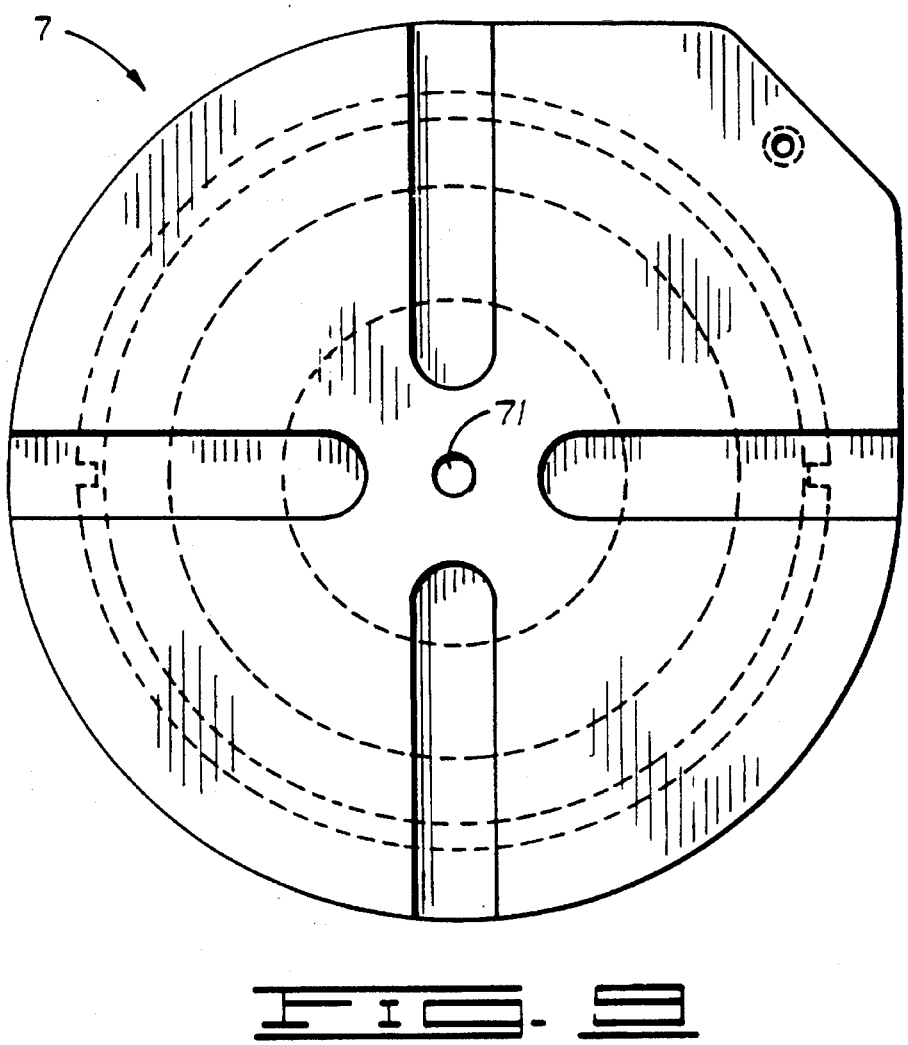
FIG. 9 is a top view of lid 7.
Figure 10:
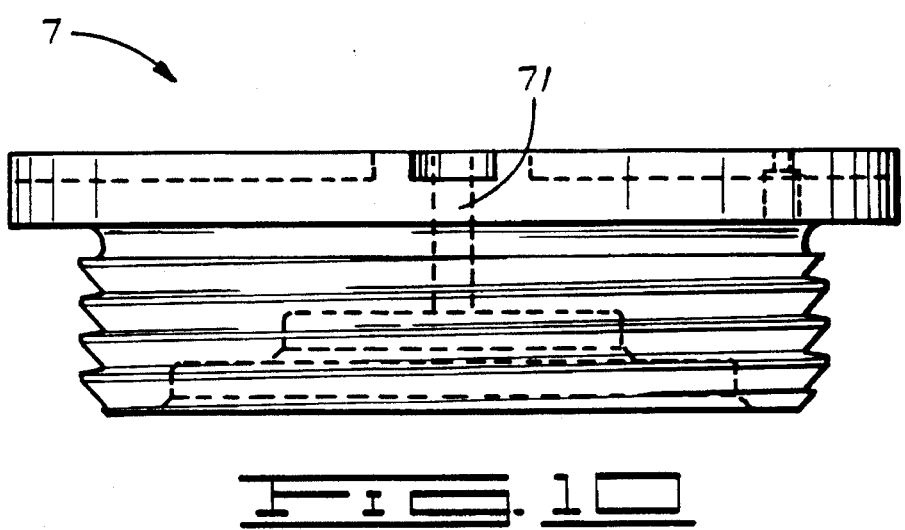
FIG. 10 is a side view of lid 7.
Figure 13:
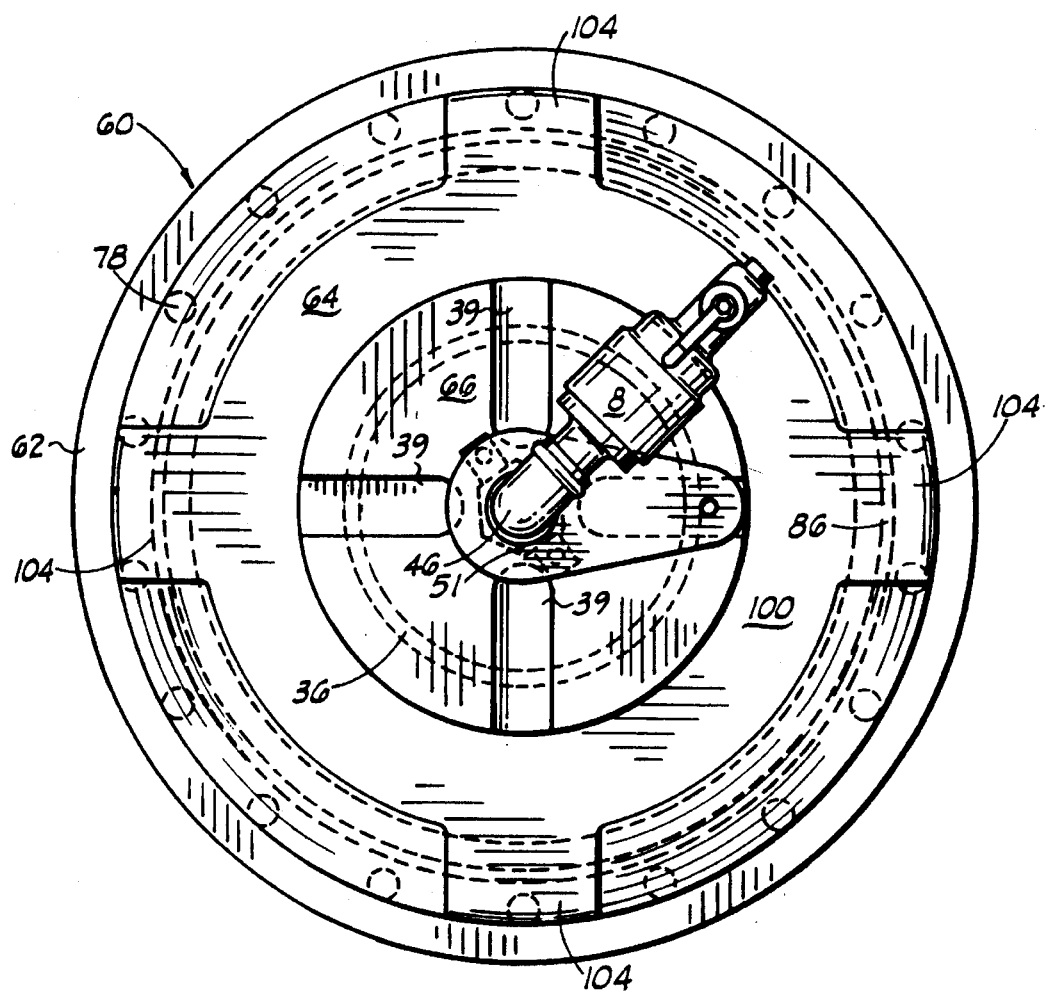
FIG. 13 is a top view of hatch apparatus 60.
Figure 11:
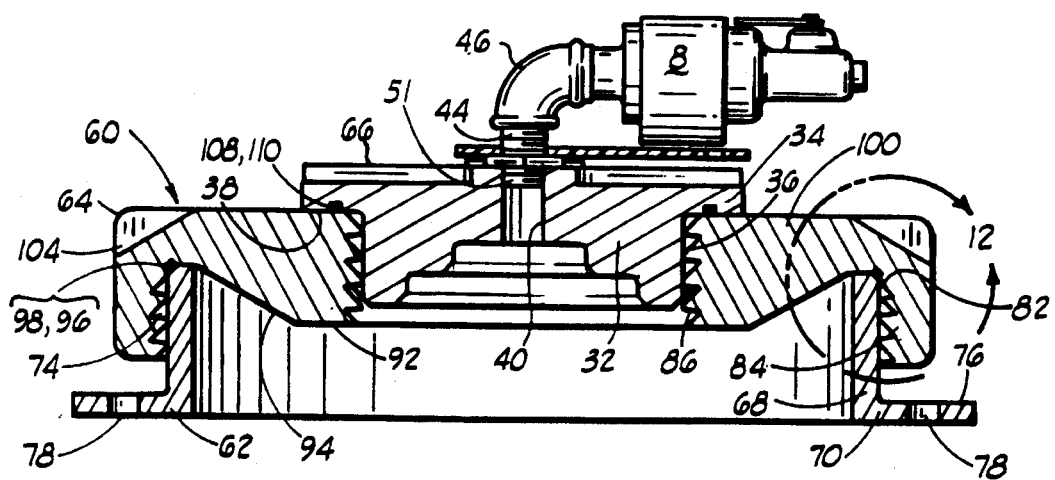
FIG. 11 is a cutaway side view of an inventive hatch apparatus 60.

Alternative lid apparatus 7 useful in conjunction with inventive hatch apparatus 2 is depicted in FIGS. 8, 9, and 10. As is apparent, lid apparatus 7 is substantially identical to lid 6 in most respects. However, rather than having a relief bore 40, lid apparatus 7 has a non-threaded cylindrical bore 71 extending therethrough. Additionally, lid apparatus 7 comprises a bolt 73 which extends longitudinally through bore 71 and is held in bore 71 by nuts 75 and washer 77. Bolt 73 has a corrosion resistant head 79 which is positioned inside lid apparatus 7 when bolt 73 is placed in bore 71. Corrosion resistant head 79 is preferably a high density polyethylene encapsulated head. Lid apparatus 7 also preferably comprises a corrosion resistant gasket 8 positioned adjacent head 79 of bolt 73. Gasket 8 is preferably a Viton polymer gasket or a Neoprene polymer gasket.

A second embodiment 60 of the inventive manway hatch apparatus is depicted in FIGS. 11–23. Hatch apparatus 60 comprises a base 62, a first lid member 64, and a second lid member 66 or 67. Base 62, first lid member 64, and second lid members 66 and 67 are preferably each composed of a non-metallic corrosion-resistant material. Most preferably, base 62, lid member 64, and lid members 66 and 67 are composed of ultra-high molecular weight polyethylene.

Base 62 of inventive hatch apparatus 60 comprises: a cylindrical collar 68 having an axial lower end 70 and an axial upper end 72; a male threaded portion 74 formed on the exterior of collar 68; and a base flange 76 extending radially outward from the axial lower end of collar 68. Base flange 76 is complementary to container flange 14 and has bolting holes 78 formed therein for bolting base 62 to container flange 14. For reasons discussed hereinbelow, base 62 also includes a frusto-conical surface 82 formed at the axial upper end 72 of collar 68.

First lid member 64 of inventive hatch apparatus 60 includes a first threaded cylindrical bore 84 and a second threaded cylindrical bore 86. First threaded bore 84 has a larger inside diameter than second threaded bore 86. Male threaded portion 74 of base 62 is threadedly receivable in first threaded bore 84 such that first lid member 64 can be threadedly connected to base 62. Second threaded bore 86, on the other hand, is sized for threadedly receiving second lid member 66 or 67. The average inside diameter of second threaded bore 86 preferably does not exceed about 80% of the inside diameter of cylindrical collar 68 of base 62. Most preferably, the average inside diameter of second threaded bore 86 does not exceed about 70% of the inside diameter of cylindrical collar 68 of base 62.

The interior of first lid member 64, as generally defined by first threaded bore 84 and second threaded bore 86, comprises: an inverted frusto-conical surface 88 extending inwardly and upwardly from the upper end of first threaded bore 84; a radial surface 90 extending inwardly from the upper edge of inverted frusto-conical surface 88; a radial surface 92 extending outwardly from the lower end of second threaded bore 86; and a frusto-conical surface 94 extending upwardly and outwardly from the outer edge of radial surface 92 to the inner edge of radial surface 90. When male threaded portion 74 of base 62 is completely received in first threaded bore 84 of first lid member 64, inverted frusto-conical surface 88 of lid member 64 abuts frusto-conical surface 82 of base 62. An O-ring 96 is preferably positioned in a groove 98 formed in frusto-conical surface 88 for sealing the threaded connection between first lid member 64 and base 62. As indicated in FIG. 12, groove 98 preferably has diverging inner walls such that the base of groove 98 is larger than the opening of groove 98.

The exterior of first lid member 64 includes a radial upper surface 100 extending outwardly from the upper end of second threaded bore 86. At least one hammer lug is preferably formed in the upper exterior of first lid member 64 for facilitating the connecting of first lid member 64 to, and the removal of first lid member 64 from, base 62. Most preferably, four hammer lugs 104 are formed in the upper exterior of first lid member 64.

Inventive hatch apparatus 60 also preferably includes a safety vent means for releasing pressure buildup in container 10 as first lid member 64 is disconnected from base 62. This safety vent means preferably includes at least one vent groove formed across either the male threaded portion 74 of base 62 or the first threaded bore 84 of first lid member 64. The safety vent means most preferably includes two vent grooves 106 formed across the male threaded portion 74 of base 62.

In one embodiment, the second lid member used in conjunction with inventive hatch apparatus 60 is second lid member 66 depicted in FIGS. 11, 13, 18, and 19. Second lid member 66 is almost identical to the above-described lid 6 of inventive hatch apparatus 2. Second lid member 66 comprises: a lower cylindrical portion 32; an upper portion 34 adjacent lower cylindrical portion 32; a male threaded portion 36 formed around lower cylindrical portion 32; a lower radial surface 38 extending outwardly from the axial upper end of lower cylindrical portion 32; a relief bore 40 extending through lower cylindrical portion 32 and upper portion 34; a female threaded portion 42 formed in relief bore 40 and extending downwardly from the upper side of second lid member 66; and at least one tool groove 39 formed on the upper side of upper portion 34.

Second lid member 66 can also include a locking arrangement identical to that of lid 6 including: an outward extension of upper portion 34 having an aperture 59 extending therethrough; a locking pin 25; and a locking pin spring 71. If second lid member 66 includes such a locking arrangement, a groove should also be formed in radial upper surface 100 of first lid member 64 for receiving pin 25 when second lid member 66 is threadedly connected to first lid member 64. The groove formed in surface 100 for receiving pin 25 will preferably be substantially identical to groove 23 formed in base 4 of inventive apparatus 2.

Male threaded portion 36 of second lid member 66 is receivable in second threaded cylindrical bore 86 of first lid member 64 such that second lid member 66 can be threadedly connected to first lid member 64. When male threaded portion 36 of second lid member 66 is completely received in second threaded bore 86, lower radial surface 38 of lid member 66 abuts radial upper surface 100 of lid member 64. The threaded connection between second lid member 66 and first lid member 64 is preferably sealed by an O-ring 108 provided in a groove 110 formed in lower radial surface 38 of second lid member 66. As indicated in FIG. 20, at least one interior wall of groove 110 preferably diverges such that the base of groove 110 is larger than the opening of groove 110.

When second lid member 66 is used in inventive hatch apparatus 60, hatch apparatus 60 preferably includes a pressure relief valve 8 of the type described hereinabove. As was the case with inventive hatch apparatus 2, pressure relief valve 8 can be connected to second lid member 66 using a connecting means including, for example, a bushing 51, a union 44, and an elbow 46.

When second lid member 66 is used in inventive hatch apparatus 60, hatch apparatus 60 also preferably includes a second safety vent means for relieving pressure buildup inside container 10 as second lid member 66 is removed from first lid member 64. This second safety vent means can include at least one vent groove formed across either second threaded bore 86 of first lid member 64 or male threaded portion 36 of second lid member 66. Most preferably, the second safety vent means includes two vent grooves 48 formed across male threaded portion 36 of second lid member 66.

As will be apparent to those skilled in the art, a modified lid apparatus 7 can also be used in inventive hatch apparatus 60 as a substitute for second lid member 66. Modified lid apparatus 7 will essentially be formed by modifying lid apparatus 7 in the same manner that lid member 6 was modified to form second lid member 66.

Figure 23:
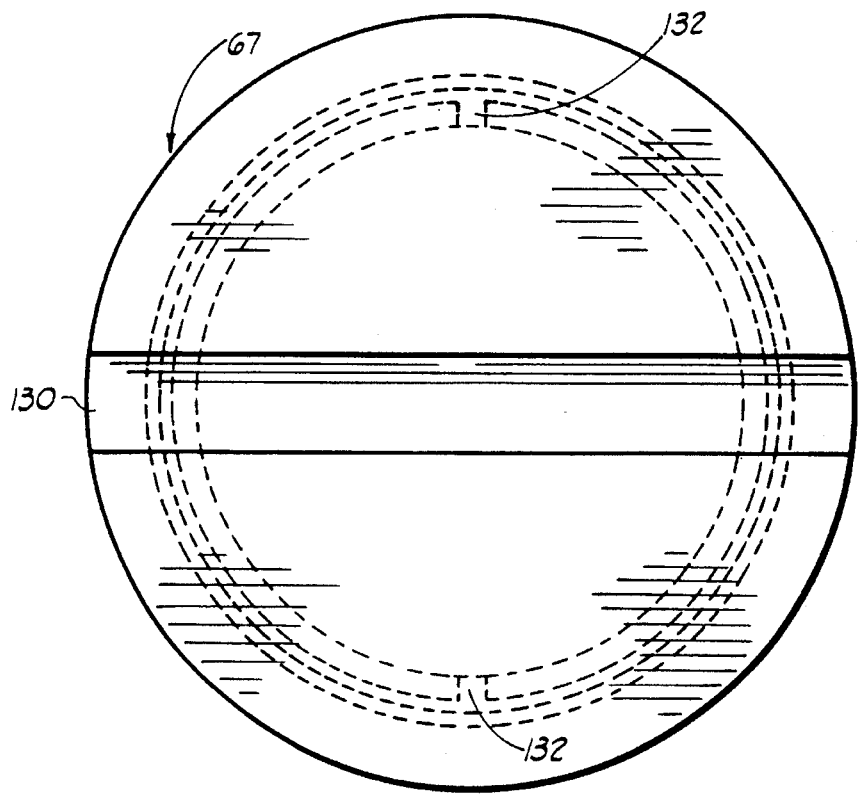
FIG. 23 is a top view of second lid member 67.
Figure 22:
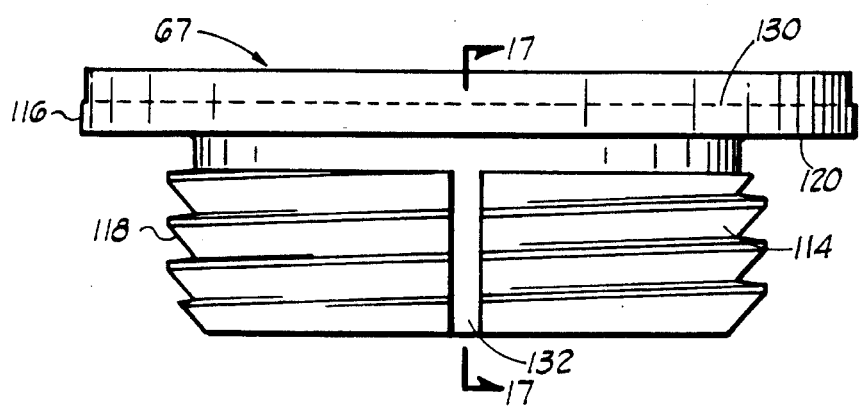
FIG. 22 is a side view of second lid member 67.
Figure 21:
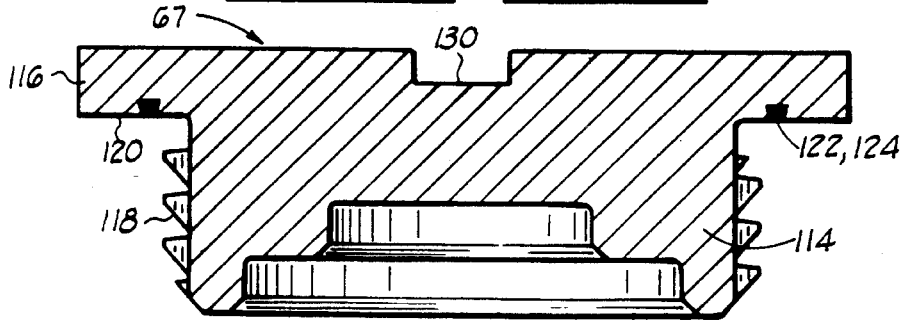
FIG. 21 is a cutaway side view of an alternate second lid member 67 for hatch apparatus 60.

In another embodiment, the second lid member used in conjunction with inventive hatch apparatus 60 is second lid member 67 depicted in FIGS. 21–23. Second lid member 67 comprises: a lower cylindrical portion 114; a male threaded portion 118 formed around lower cylindrical portion 114; and an upper portion 116 adjacent the axial upper end of lower cylindrical portion 114 and having a radial lower surface 120 extending outwardly from the axial upper end of lower cylindrical portion 114. As was the case with lid member 66, second lid member 67 can also include a locking arrangement identical to that of lid 6 comprising: an outward extension of upper portion 116 having an aperture extending therethrough; a locking pin; and a locking pin spring.

Male threaded portion 118 of second lid member 67 is receivable in second threaded cylindrical bore 86 of first lid member 64 whereby lid member 67 can be threadedly connected to lid member 64. When male threaded portion 118 is completely received in second threaded bore 86, lower radial surface 120 of lid member 67 abuts radial upper surface 100 of lid member 64. An O-ring 122 is preferably provided in a groove 124 formed in lower radial surface 120 for sealing the threaded connection between lid member 67 and lid member 64. As indicated in FIG. 21, the interior sides of groove 124 preferably diverge such that the base of groove 124 is larger than the opening of groove 124.

As further indicated in FIGS. 21–23, a slot 130 is preferably formed in the top of second lid member 67. Slot 130 preferably has a rectangular cross section such that a rod, or other member, having a rectangular cross-sectional shape corresponding to that of slot 130 can be placed in slot 130 and used for connecting second lid member 67 to, and disconnecting second lid member 67 from, first lid member 64.

When second lid member 67 is used, inventive hatch apparatus 60 also preferably includes a second safety vent means for relieving pressure buildup inside container 10 as second lid member 67 is removed from first lid member 64. This second safety vent means can include at least one vent groove formed across either second threaded bore 86 of first lid member 64 or male threaded portion 118 of second lid member 67. Most preferably, the second safety vent means includes two vent grooves 132 formed across male threaded portion 118 of second lid member 67.

As will also be apparent to those skilled in the art, a lid member substantially identical to second lid member 67 could also be used in inventive hatch apparatus 2 as a substitute for lid members 6 and 7.

Inventive Material Storage And/Or Transportation Apparatus

A material storage and/or transportation apparatus 150 provided by the present invention is depicted in FIGS. 24–28. Inventive apparatus 150 is particularly well-suited for storing and/or transporting acids and other fluids used for treating wells. Inventive apparatus 150 comprises: a tank 154; a first manway opening 156 extending through the top of tank 154; a second manway opening 158 extending through the top of tank 154; a first manway flange 160 connected to the exterior of tank 154 and surrounding first manway opening 156; a second manway flange 162 connected to the exterior of tank 154 and surrounding second manway opening 158; an inventive blanking hatch arrangement 164 removably connected to first manway flange 160; a manway hatch apparatus 166 removably connected to second manway flange 162; and a spill handling system 168 associated with second manway flange 162 and manway hatch apparatus 166. As will be apparent to those skilled in the art, one or more of these inventive tanks 150 can be readily mounted on a trailer or other transportation vehicle.

Tank 154 can be composed of generally any material which is useful for forming fluid storage and/or transportation tanks. In one embodiment of the present invention, tank 154 can be a metal tank having a corrosion-resistant plastic liner. For example, tank 154 can be a tank system of the type disclosed in U.S. Pat. No. 4,625,892 wherein a rotomolding process is used to directly form a plastic inner tank inside a metal outer tank. The entire disclosure of U.S. Pat. No. 4,625,892 is incorporated herein by reference.

Inventive blanking hatch arrangement 164 preferably includes a circular blanking hatch 152 of the structure depicted in FIGS. 27 and 28. Blanking hatch 152 is preferably a non-metallic, disk-shaped piece including: a plurality of bolt holes 172 provided near the perimeter of hatch 152 for bolting hatch 152 to first manway flange 160; a smooth cylindrical aperture 174 extending through hatch 152; a plurality of bolt holes 176 surrounding cylindrical aperture 174 and extending through hatch 152; two threaded apertures 178 and 180 adjacent aperture 174 and extending through hatch 152; and a third threaded aperture 182 adjacent threaded apertures 178 and 180 and extending through hatch 152. Blanking hatch 152 is preferably composed of a highly corrosion-resistant, non-metallic material. Blanking hatch 152 is most preferably composed of ultra-high molecular weight polyethylene. Ultra-high molecular weight polyethylene provides strength and a high degree of corrosion resistance.

A gasket 184 (not shown) is preferably positioned between blanking hatch 152 and tank manway flange 160. Blanking hatch 152 is preferably bolted to manway flange 160 using steel backing brackets 186. Backing brackets 186 operate to prevent the heads of the connecting bolts from being pulled into or through the plastic material of blanking hatch 152.

Blanking hatch arrangement 164 also comprises: a pressure relief valve 188 which is threadedly connected in threaded aperture 180 of blanking hatch 152; a vacuum relief valve 190 which is threadedly connected in threaded aperture 178 of blanking hatch 152; and a high fluid level indicating device 192 which extends into tank 154 and is threadedly connected in aperture 182 of blanking hatch 152. Pressure relief valve 188, vacuum relief valve 190, and level indicating device 192 are preferably composed of the same material as blanking hatch 152. Relief valves 188 and 190 operate to relieve substantial pressure differentials which may be caused to exist between the interior and the exterior of tank 154.

Blanking hatch arrangement 164 preferably further comprises a dip tube 194 having a flanged end 196. Dip tube 194 extends through smooth cylindrical aperture 174 of blanking hatch 152 and into tank 154. Flanged end 196 of dip tube 194 is bolted to the top of blanking hatch 152 using bolts 198. A gasket 200 (not shown) is preferably positioned between flanged end 196 and the top of blanking hatch 152. When thus positioned in tank 154, dip tube 194 will preferably extend to near the bottom of tank 154. Bolts 198 are preferably stainless steel bolts having polyethylene encapsulated heads 199. The polyethylene encapsulating material surrounding the heads of bolts 198 protects the bolts from corrosion. The encapsulated heads of bolts 198 are preferably positioned inside tank 154 with gaskets 204 (not shown) positioned between the heads of bolts 198 and the interior/bottom side of blanking hatch 152.

Dip tube 194 can be used for feeding material to and/or recirculating material in tank 154 by connecting a feed and/or recirculation conduit to the flanged end 196 of dip tube 194. Such feed and/or recirculation conduit is preferably connected to flanged end 196 using the polyethylene encapsulated bolts 198 which extend through flanged end 196 and through blanking hatch 152.

Dip tube 194 can be formed from a highly corrosion-resistant metallic material such as Hastaloy C or Carpenter 20. Preferably, dip tube 194 is composed of PVC, ultra-high molecular weight polyethylene, or some other highly corrosion-resistant non-metallic material.

Manway hatch apparatus 166 is preferably bolted to second manway flange 162. A spillwell 208 (discussed hereinbelow) is positioned between hatch apparatus 166 and manway flange 162. Additionally, gaskets 206 (not shown) are preferably positioned between manway hatch apparatus 166 and spillwell 208 and between spillwell 208 and manway flange 162. Manway hatch apparatus 166 can be generally any type of manway hatch which has been used heretofore in the art (e.g., a lined metal manway hatch of the type described hereinabove). Manway hatch apparatus 166 is preferably an inventive non-metallic hatch apparatus of the type described herein and depicted in FIGS. 1–23. The manway hatch apparatus 166 shown in FIGS. 24–26 is identical to inventive manway hatch apparatus 2 depicted in FIGS. 1–10 with the exception that the lid of hatch apparatus 166 has neither a relief bore 40 nor a cylindrical bore 72 extending therethrough. Manway hatch apparatus 166 is preferably composed of ultra-high molecular weight polyethylene.

Spill handling system 168 comprises: a spill well 208 which is positioned around manway flange 162; a drainage port 210 provided in the bottom of spill well 208; a drainage line 212 extending downward from drainage port 210; and a valve 214 disposed in drainage line 212. Spill well 208 is preferably composed of the same material as the plastic liner of tank 154. Spill well 208 can be formed in conjunction with the liner of tank 154 using a rotational molding technique as described in U.S. Pat. No. 4,625,892.

The gaskets 184, 200, 204, and 206 used in inventive apparatus 150 are preferably composed of closed cell polyethylene foam, a highly corrosion-resistant rubber material such as VITON or NEOPRENE, Buna N, or some other highly corrosion-resistant gasket material.

The inventive apparatus advantageously provides numerous access connections (e.g., recirculation system connections, pressure and/or vacuum relief system connections, instrument connections, etc.) into tank 154 while minimizing the number of individual openings which must be provided through the wall of tank 154. As will be apparent to those skilled in the art, alternative types, sizes, and arrangements of apertures can be formed through blanking hatch 152 to facilitate the connection of various types and combinations of instruments and devices.

By minimizing the number of individual openings which must be provided through the wall of tank 154, the inventive apparatus alleviates substantial problems currently encountered in the art. To comply with the requirements of DOT Regulation 412, for example, numerous access connections are required in acid transport tanks and other fluid transport tanks. However, when such tanks are lined, substantial potential for tank liner failure exists in the vicinity of the tank openings. The necessity of forming and lining multiple openings in the wall of a tank also increases the overall cost of constructing the tank. Thus, by minimizing the number of individual tank openings required, the present invention reduces tank construction costs and reduces the likelihood of tank liner failure.

Non-Conventionally Shaped Access Hatch

The preferred embodiment of the present invention disclosed herein is primarily depicted in FIGS. 29, 30, and 31. However, certain components and features of the present invention are also depicted in various preceding figures and described in the preceding text.

Referring now to FIG. 29 of the drawings wherein a top view of a non-circular, or obround, hatch assembly 300 having several apertures therein is shown. Hatch assembly 300 is contoured to match and be fitted to a like-shaped flange 344, shown in FIG. 31, that is associated with a vessel such as vessel 343, also shown in FIG. 31. Hatch assembly 300 includes a non-circular base 302 preferably made of ultra-high molecular weight polyethylene having opposing radiused outer edges 304 and opposing relatively straight edges 306. The overall geometry of the base 302 may be defined with respect to a major axis 308 and a maximum minor axis such as 316. In the particular embodiment shown in FIG. 29, minor axis 316 has a dimension of approximately 22.75 inches (57.8 cm) and major axis 308 has a dimension of approximately 44.5 inches (113.0 cm). The thickness of base 302 in the embodiment shown in FIG. 30 is approximately 4.0 inches (10.2 cm). Such a thickness is needed in order to withstand a minimum test pressure of 36 psig (2.5 kgs/cm$^2$) required by the U.S. Department of Transportation. (Returning now to FIG. 29, base 302 at a preselected point along axis 308, has a circular threaded primary opening 311 therethrough for receiving a threaded circular hatch 7. Circular hatch 7 and complementary threads 18 were previously described and shown herein, for example, refer to FIGS. 8, 9, and 10 herein. Circular hatch 7 is sealed to base 302 by an O-ring placed within an accommodating groove as described and shown previously. Circular hatch 7, as described previously, can be provided with a lever 50 bolted to hatch 7 by acid protected nuts 75 and bolt 73. Lever 50 is secured by lanyard 52 to prevent the loss of hatch 7. Locking pin 25 is accommodated in a groove 338 which also serves as a drain passage. Groove 338 is provided with at least one discharge port 340 for discharging any sloshed or spilled fluid away from the proximity hatch opening 311 and preferably into a spillwell 350 described below.

Base 302, at a minor axis 312 which intersects major axis 308 at a preselected point, has a preferably circular opening 330 therethrough for acting as a port for receiving a recirculation line 348, shown in FIG. 31. Recirculation opening, or port, 330 has a plurality of bolt holes 331 prepositioned for accommodating a bolt-on flange that serves to sealingly secure a recirculation line thereagainst. As can be seen in FIG. 31, recirculation line 348 is provided with a T-geometry for improved circulation within the bottom of vessel 343.

Returning to FIG. 29, preferably base 302, at a minor axis 314 located at a preselected point along axis 308, a pair of openings, or ports 327 and 333 respectively, being oppositely located at a predetermined distance from axis 308. Preferably, opening, or port, 333 is threaded to receive a pressure relief valve 334 having matching threads in order to sealingly secure pressure relief valve 334 to base 302. Opposite of port 333 is port 327 which is preferably configured and sized to receive a high fluid level warning indicator 328 such as a light or some means of signaling the operator that the associated tank is practically full. Port 327 is preferably threaded in order to receive complementary threaded high level indicator means 328. Both high level indicator 328 and pressure relief valve 332 are preferably centered equidistantly from and on opposite sides of major axis 308.

Preferably additional ports, 325 and 335, are located on yet another minor axis 316 which is laterally proximate to minor axis 314. Ports 325 and 335 are again preferably oppositely centered equidistantly from axis 308. Port 325 is preferably threaded for receiving a vacuum relief valve means 326 for relieving a negative pressure from within a vessel such as vessel 343. Opposing port 335 provides a site for an optional pressure relief valve means 335. Optional pressure relief valve means 335 is preferably sealingly secured to base 302 by a way of a threading optional relief valve 335 into port 335 which is provided with matching threads.

Base 302 is secured to flange 344, shown in FIGS. 30 and 31, by fasteners 322, such as bolts, passing through relatively straight backing plates 318, and radiused backing plates 320, which are positioned proximate to respective edges 306 and 304 of base 302. Spillwell 350, as shown in FIG. 31, is positioned on top of flange 344, which is preferably elevated by manway neck 346, which provides an accessible opening into vessel 343. Spillwell 350 provides a convenient means for controlling spills about the top of container 343 when access hatch assembly 300 or when hatch 7 of primary opening 311 has been left open, or has not been properly secured. Spillwell 350 may be sealed against flange 344 by an obround gasket. Spill well 350 is preferably composed of the same material as a plastic liner installed in tank 343, such as in accordance with the rotational molding technique described in U.S. Pat. No. 4,625,892. A spillwell may be fashioned in accordance to the spillwell shown in FIG. 24, which has drain tube extending downward along the vessel and terminating into a valve for selectively draining any accumulated fluid.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A hatch apparatus for a container having a container wall and having a non-circular container opening extending through the container wall and a non-circular container flange connected to the exterior of the container wall and surrounding the container opening, the hatch apparatus comprising:

a non-metallic, non-circular access hatch connectable to the container flange by bolting, the non-metallic, non-circular hatch having a plurality of apertures extending therethrough;

the access hatch further having a primary opening having a removable non-metallic lid associatable with the primary opening; and a primary cover locking means for securing the lid in a closed position.

2. A hatch apparatus as described in claim 1 further comprising:

a recirculation tube having a flange connection, the tube being extendable into the container through a first of the apertures and the tube flange connection being connectable to the access hatch by bolting;

a pressure relief means associatable with a second of the apertures for relieving a pressure differential between the interior and the exterior of the container;

a level indicating means associatable with a third of the apertures for indicating a fluid level in the container;

a vacuum relief means associatable with a fourth of the apertures for relieving a negative pressure differential between the interior and the exterior of the container;

a primary opening defined by a fifth aperture located in the access hatch;

a removable non-metallic cover associatable with the primary opening; and primary cover securing means for securing the removable cover in a closed position.

3. A hatch apparatus as described in claim 2 wherein the pressure relief means is threadedly associatable with the second aperture and the level indicating means is threadedly associatable with the third aperture.

4. A hatch apparatus as described in claim 2 wherein said access hatch is comprised of ultra-high molecular weight polyethylene.

5. A hatch apparatus as described in claim 2 wherein the primary opening is threadedly associatable with the removable cover.

6. A hatch apparatus as described in claim 2 further comprising at least one safety vent groove defined across said primary cover threaded portion.

7. A hatch apparatus as described in claim 2 further comprising the container flange having a spillwell means for controlling spillage about the proximity of the access hatch.

8. An apparatus for holding materials comprising:

a container including a container wall and having a non-circular container opening extending through the container wall;

an obround container flange, having a preselected thickness, connected to the exterior of the container wall and surrounding the container opening, and the container flange having an integral spillwell;

a non-metallic, obround access hatch, having a preselected thickness, connectable to the container flange by bolting, the non-metallic, non-cylindrical hatch having a plurality of apertures extending therethrough;

a recirculation tube having a flange connection, the tube being extendable into the container through a first of the apertures and the tube flange connection being connectable to the access hatch by bolting;

a pressure relief means associatable with a second of the apertures for relieving a pressure differential between the interior and the exterior of the container;

a level indicating means associatable with a third of the apertures for indicating a fluid level in the container;

a vacuum relief means associatable with a fourth of the apertures for relieving a negative pressure differential between the interior and the exterior of the container;

a threaded circular primary opening defined by a fifth aperture located in the access hatch;

a removable non-metallic circular cover threadedly associatable with the threaded primary opening; and primary cover locking means for securing the removable cover in a closed position.

9. An apparatus as described in claim 8 further comprising the access hatch and primary cover being made of a polymer material consisting of ultra-high molecular weight polyethylene.

10. An apparatus as described in claim 9 further comprising backing plates being used in conjunction with the bolting of the access hatch to the container flange.

* * * * *